March 17, 1953 W. KOBER 2,632,123
ALTERNATING CURRENT MACHINE
Filed July 6, 1944 9 Sheets-Sheet 1

INVENTOR.
WILLIAM KOBER
BY
ATTORNEY.

March 17, 1953 W. KOBER 2,632,123
ALTERNATING CURRENT MACHINE
Filed July 6, 1944 9 Sheets-Sheet 2

INVENTOR.
WILLIAM KOBER.
BY William D. Hall.
ATTORNEY.

March 17, 1953 W. KOBER 2,632,123
ALTERNATING CURRENT MACHINE
Filed July 6, 1944 9 Sheets-Sheet 3
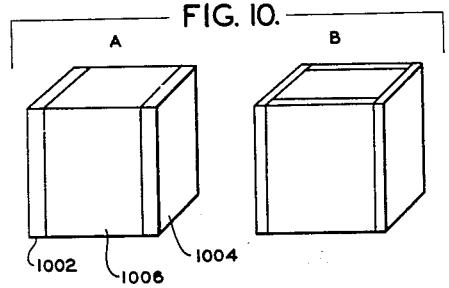
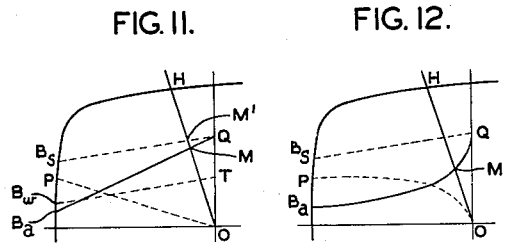
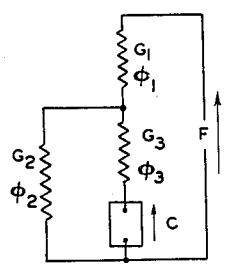
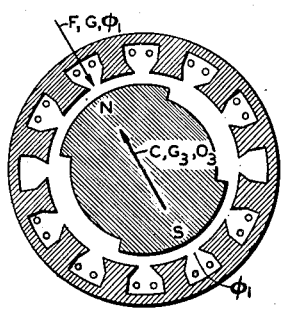
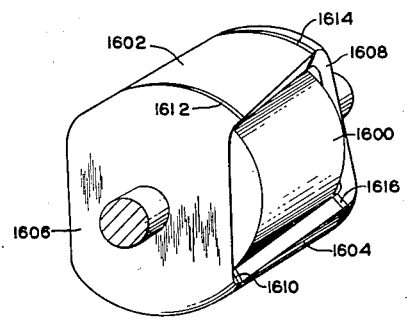
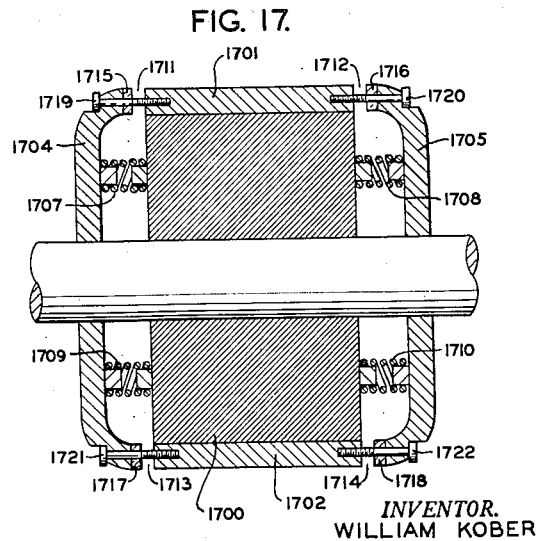
INVENTOR.
WILLIAM KOBER
BY William D. Hall.
ATTORNEY.

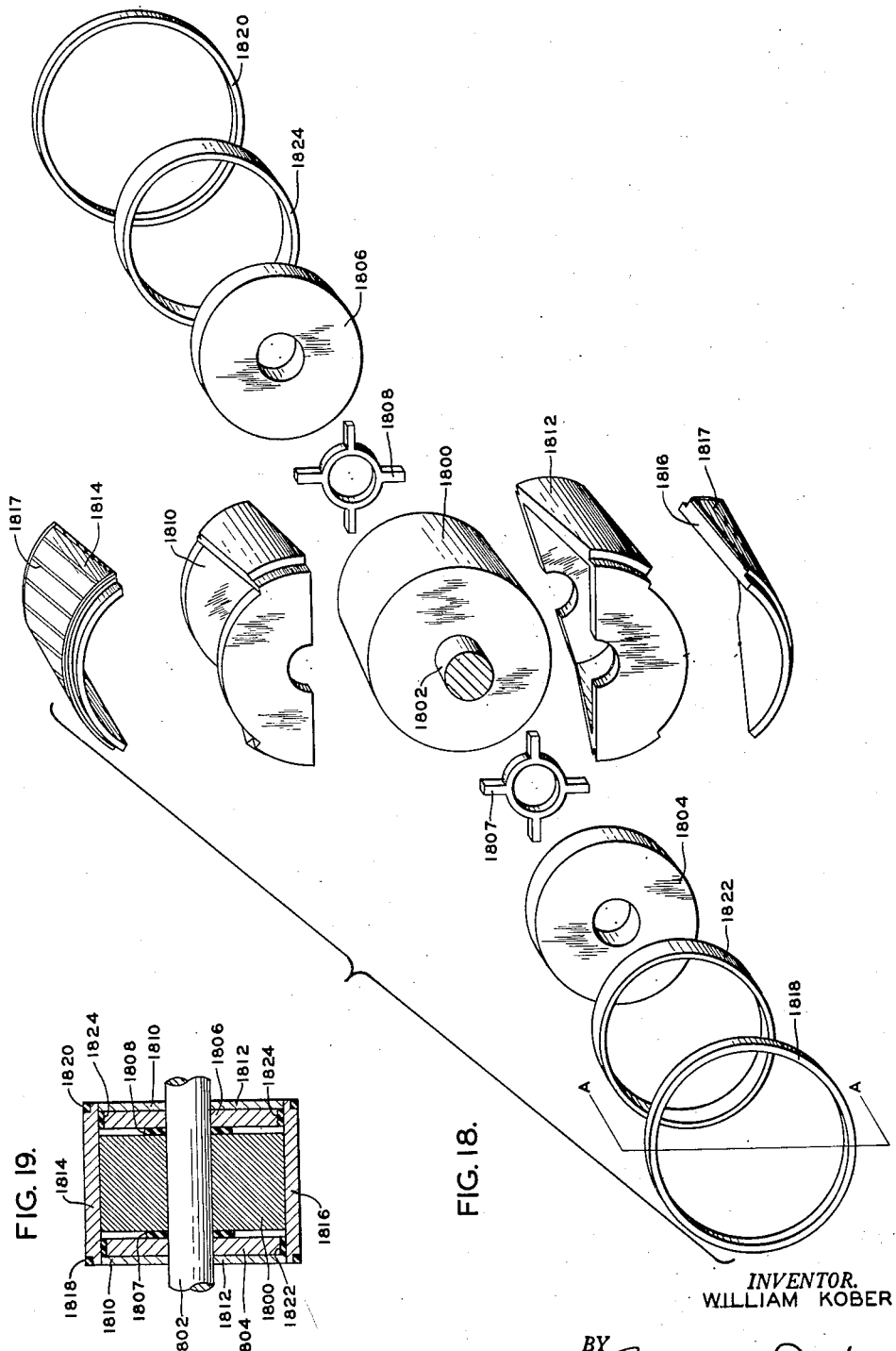

March 17, 1953  W. KOBER  2,632,123
ALTERNATING CURRENT MACHINE
Filed July 6, 1944  9 Sheets-Sheet 5
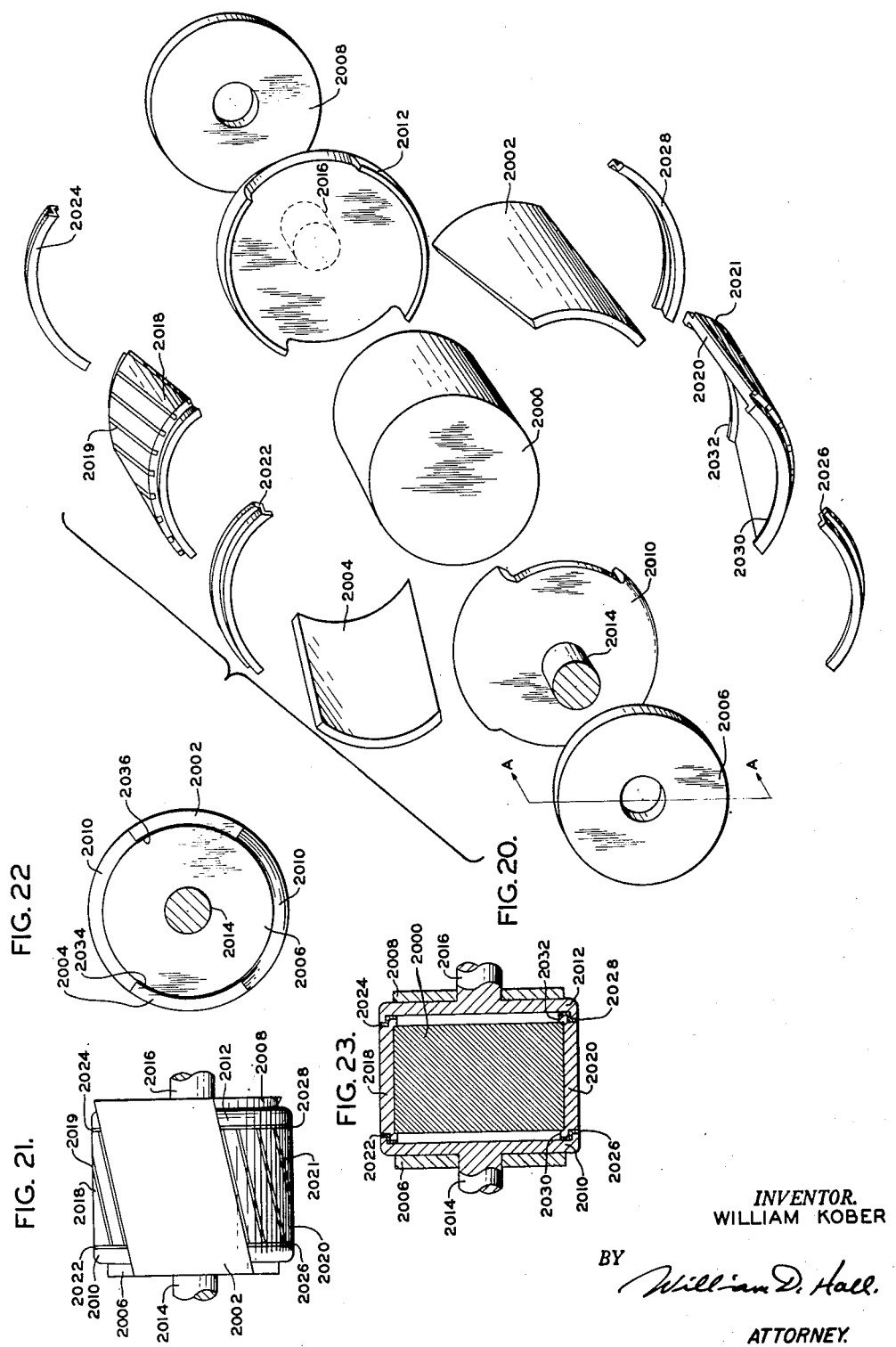
INVENTOR.
WILLIAM KOBER
BY William D. Hall.
ATTORNEY.

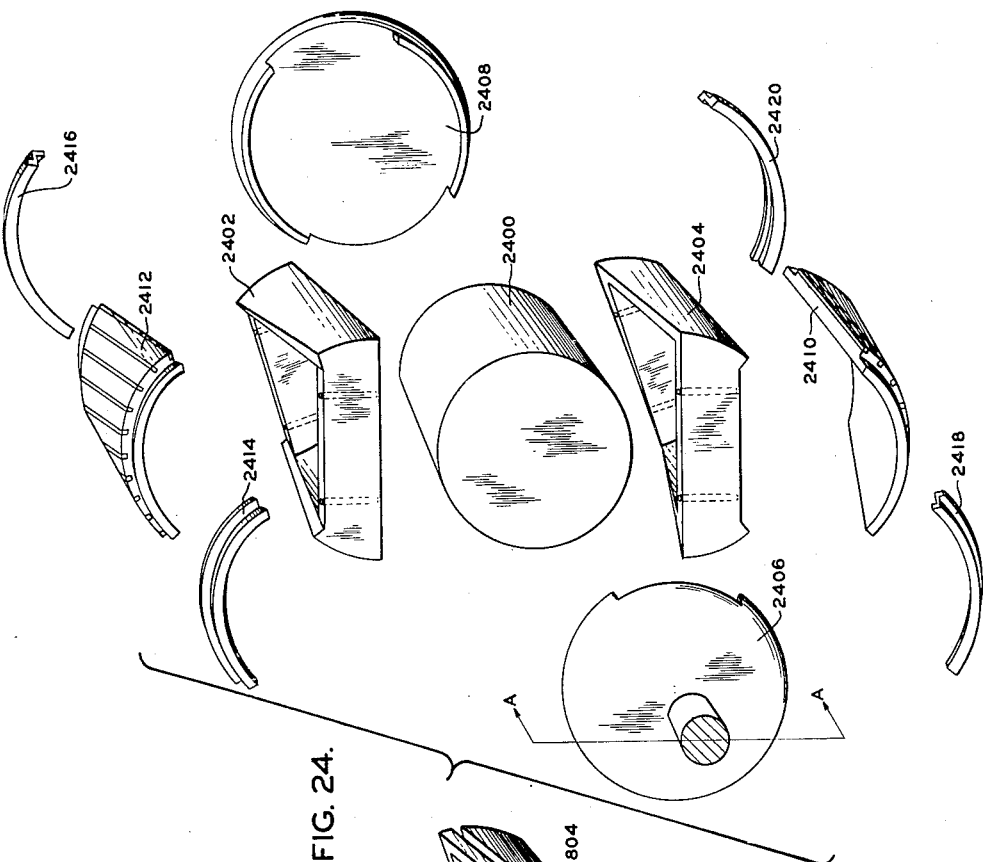
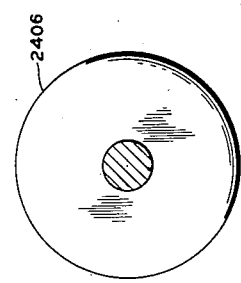
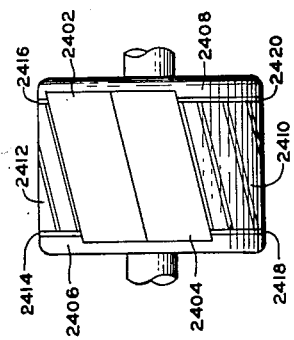
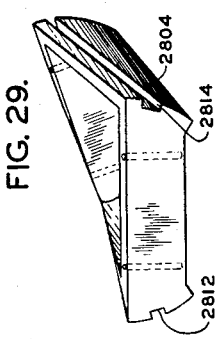
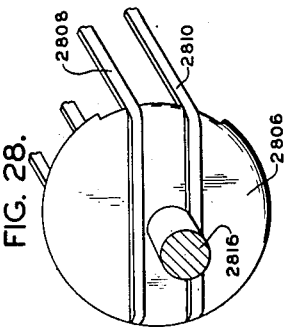
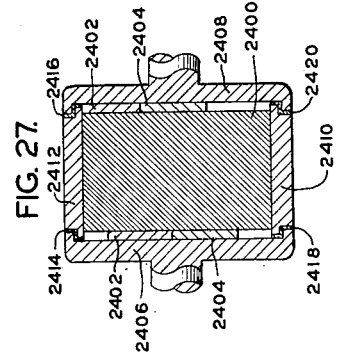

March 17, 1953  W. KOBER  2,632,123
ALTERNATING CURRENT MACHINE
Filed July 6, 1944  9 Sheets-Sheet 7

INVENTOR.
WILLIAM KOBER
BY William D. Hall
ATTORNEY.

March 17, 1953 W. KOBER 2,632,123
ALTERNATING CURRENT MACHINE
Filed July 6, 1944 9 Sheets-Sheet 8

INVENTOR.
WILLIAM KOBER
BY William D. Hall.
ATTORNEY.

*INVENTOR.*
WILLIAM KOBER

BY William D. Hall.

ATTORNEY

Patented Mar. 17, 1953

2,632,123

UNITED STATES PATENT OFFICE 2,632,123

ALTERNATING CURRENT MACHINE

William Kober, Spring Lake, N. J., by decree of court to the United States of America as represented by the Secretary of the Army Application July 6, 1944, Serial No. 543,744

16 Claims. (Cl. 310—156)

(Granted under Title 35, U. S. Code (1952), sec. 266)

The invention described herein may be manufactured and used by or for the Government for governmental purposes, without the payment to me of any royalty thereon.

This invention relates to alternating current machines, and particularly to alternating current machines using rotors made of permanent magnet alloys.

The recent development of permanent magnet alloys having a high available energy has extended considerably the field of permanent magnet applications. Prominent among these new materials is the group of aluminum, nickel, cobalt, copper and iron alloys which have been given the name "Alnico." There are available at present numerous grades of "Alnico," each different in composition and heat treatment, to produce properties suitable for a wide range of applications. These alloys are characterized by coercive forces of 400–700 oersteds, residual inductions of 6,500–12,500 gausses, and available energy values ranging from $1.3 \times 10.6$ to $4.5 \times 10^6$ ergs.

One of the most difficult fields of application for permanent magnets is in electrical motors and generators. Here, from some points of view, the use of permanent magnets in place of field electromagnets is highly desirable. The elimination of field windings is one obvious item. The structural designs necessary to utilize the field windings properly and to hold them securely mechanically on the rotor are costly and ordinarily result in mechanically difficult solutions; elimination of the complications introduced by the field windings is, therefore, always desirable if the substituted solution itself does not introduce many problems of its own. Their elimination also results in the saving of excitation energy and the necessity for eliminating the heat generated in the windings. These considerations apply to both A. C. and D. C. machines. Moreover, the machine with the field windings needs a D. C. source for exciting the field, and of course, A. C. is produced at the machine terminals. Although a number of solutions to this problem are known, they are all relatively unwieldy. The most widely used solution is of course the well-known separate exciter which is good when large generators are involved; another solution is the use of a D. C. type generator with the commutator connected to the field windings and a separate A. C. winding inserted between the conductors of the D. C. winding. In recent years, rectifier circuits have come into use, dry disc rectifiers being used for providing a D. C. source for small A. C. generators. The inherent regulation of such generators is ordinarily poor. Small A. C. generators sometimes are provided with excitation by connecting a large condenser across the terminals of the machine and relying on the resulting large magnetizing component of the armature reaction as an exciter for the field. In the latter arrangement the condenser must be unduly large, and even when this costly requirement is satisfied, the regulation of the machine is obviously very poor. Permanent magnet excitations were also attempted, only to be abandoned in the majority of cases because of loss of excitation when the machines of such type are accidentally subjected to short-circuiting conditions or heavy load conditions.

The advantages of using permanent magnet excitation, if such is made to survive the short-circuiting conditions, are many. With a permanent magnet rotating field, it becomes possible to use a simple construction with no current transfer from moving to stationary parts, and rotor construction becomes almost ideal from the point of view of ruggedness and freedom from trouble in prolonged severe use. For use near radio sets, or as a power supply for them, this construction possesses the additional advantage of creating no electrical noise or interference by unavoidable sparking at commutators or slip rings.

As noted above, however, application of even the new "Alnico" materials to motors and generators is difficult. The principles used by the art in the design of such applications are illustrated by an article by Hornfeck and Edgar in the AIEE Journal 1940, vol. 59, pp. 1017–1024.

It may be seen from the above article that the magnet material must be worked on a "minor hysteresis loop," and the efficiency of the magnet material immediately becomes much less than that obtained from the "major" loop. To maintain even the moderate efficiency of a fair minor hysteresis loop, a certain "dimension" ratio, or ratio of length to diameter of the magnet material was found by the art to be a necessary condition. This dimension ratio is usually in direct conflict with the design requirements of compact and light machines, since the dimension ratio calls for long magnets of small cross section. The magnet length increases bulk and weight of the machines, while the small cross section produces only a limited amount of total flux. Thus, the advantages in weight and performance obtainable from the new materials are lost wholly or in large part because of contradictory design factors imposed by the special dimensional requirements of motor and generator design.

The above limiting considerations are present whenever the magnet operates in circuits of varying permeability. These limiting considerations, therefore, are also applicable to the design of lifting magnets, field producing magnets, etc.

When magnets are used in electrical machinery, the high load currents, and especially short circuit currents, the latter being the most severe case of load currents, produce tremendous magnetic stresses that cause a change in the magnet condition and large permanent reductions in magnet flux and machine voltage. It is acknowledged in the art that a permanent magnet generator cannot be used safely unless it has been so constructed that the desired voltage is arrived at after repeated short circuits have been applied to at least a part, and in most cases, all of the armature windings. This process, referred to as "stabilization," usually causes at least a 35% loss of flux, and a 35% loss of output voltage. If the design is limited by heating, this means a reduction to 65% of the "unstabilized" output; if it is limited by a permissible percentage of voltage regulation, it results in a reduction to 42% of the "unstabilized" output.

A further difficulty with the permanent magnet designs of the prior art is that they do not lend themselves to compensation for voltage drop under load. This is particularly true for an alternator, since alternators normally have a greater voltage drop under load than D. C. machines. In the series-excited and separately excited machines, the exciting current can be increased to compensate for this drop, but this remedy is not practical with the permanent magnet alternator.

On the whole, then, in spite of the use of the best of the permanent magnet materials and in spite of the great advantages inherent in the elimination of electromagnets, the prior art could not produce permanent magnet generators, either A. C. or D. C., superior to, or even as good as, the conventional electromagnet designs, weight for weight or volume for volume. The invention discloses the methods and structures which improve the permanent magnet generators and motors from the point of view of their weight, volume, and performance characteristics.

The general objects of this invention, therefore, are to improve the output of permanent magnet machines per unit weight and unit volume. These objects are obtained by means of new and novel structures associated with the permanent magnet field, based on principles of design not previously known to the art. The objects of these structures are:

1. To improve magnet efficiency while preserving a magnet shape well adapted to fit the general design of the machine.

2. To protect the magnet against the most severe demagnetizing forces arising during use, such as during overload or short circuit. In such a design, the "stabilization" loss above described may be reduced to negligible amounts or even actually to zero.

3. To reduce the terminal voltage drop under load or improve the regulation of A. C. generators using permanent magnet rotors.

A more specific object of this invention is to provide a new structure for a permanent magnet field assembly for an alternating current machine which will resist demagnetization by transients due to sudden application of load or by short circuits.

Another object of this invention is to provide an alternating current machine with a conducting loop surrounding a permanent magnet, this loop having sufficient conductivity for successfully resisting a harmful amount of flux change in the permanent magnet due to sudden applications of load or short circuits.

Another object of this invention is to provide a permanent magnet field structure which aids to reduce the synchronous reactance of the machine, resulting in improved voltage regulation when such machines are used as generators, and a superior pull-in-torque when such machines are used as synchronous motors.

Still another object of this invention is to provide a magnetic shunt for a permanent magnet, this shunt enabling operation of the permanent magnet material on a much more favorable part of its magnetization characteristic when the magnet is in use by providing a low reluctance path for the flux of the permanent magnet when it is removed from the magnetizer or the low reluctance circuit of the working environment respectively, in the history of its assembly or repair. This low reluctance path prevents loss of magnetization by the permanent magnet which otherwise takes place when it is exposed to full air demagnetization.

Still another object of this invention is to provide a permanent magnet field structure for a generator or motor which provides a by-pass path for the demagnetizing fluxes produced by the armature reaction, permitting operation of the permanent magnet field on a more favorable part of the magnetization characteristic of the permanent magnet material by protecting the permanent magnet material from said demagnetizing forces.

Still another object of this invention is to provide a rotor for an alternating current machine with a permanent magnet field which is equipped with a conducting loop resisting demagnetization of the permanent magnet by transients due to sudden application of load or by short circuits, and with a magnetic shunt which results in much higher effective flux density of the field and lighter machines per unit of rated capacity.

Still another object of this invention is to provide a permanent magnet rotor machine in which the rotor shaft is mounted either on the magnetic shunt or the conducting loop and does not pass through the permanent magnet material.

Still another object of my invention is to provide a generator set which does not generate any interference signals, and, therefore, may be used successfully in proximity to the communication equipment without producing any reduction in the normal signal to noise ratio in the communication sets.

Still another object of my invention is to provide a mechanical and electrical structure for accomplishing the above mentioned objects which is inherently stable in operation, does not require any adjustments, has no make or break contacts, is compact, simple and inexpensive to manufacture, and, with the exception of one species, has no moving parts.

The novel features which I believe to be characteristic of my invention are set forth with particularity in the appended claims, my invention itself, however, both as to its organization and method of operation, together with further objects and advantages thereof may best be understood by reference to the following description taken in connection with the accompanying drawings in which:

Figures 1, 2, 4, and 4-A are explanatory figures which are used to aid the understanding of the invention.

Figures 10 and 13 are side views of a permanent magnet provided with a magnetic shunt.

Figures 11, 12, 14, and 15 are explanatory figures which are used to aid the proper understanding of the invention.

Figure 16 is an oblique view of a salient pole permanent magnet rotor provided with a fixed magnetic shunt.

Figure 17 is a vertical cross-sectional view of a salient pole permanent magnet rotor provided with a variable magnetic shunt.

Figure 18 is an oblique exploded view of a salient pole permanent magnetic rotor provided with a magnetic shunt and a protecting loop, the loop surrounding the magnetic shunt as well as the magnet.

Figure 19 is a vertical sectional view of the rotor illustrated in Fig. 18 in an assembled form, the section being taken along line A—A shown in Fig. 18.

Figure 20 is an exploded oblique view of a salient pole permanent magnet rotor with a magnetic shunt and a conducting loop, the loop surrounding the magnetic shunt and the permanent magnet, and with the shaft of the rotor mounted in the magnetic shunt.

Figures 21, 22, and 23 are side, end, and vertical cross-sectional views respectively of the rotor illustrated in Fig. 20, the vertical section for Fig. 23 being taken along line A—A shown in Fig. 20.

Figure 24 is an exploded oblique view of a salient pole permanent magnet rotor provided with a conducting loop and a magnetic shunt, the magnetic shunt partially surrounding the conducting loop, and the rotor shaft attached to the magnetic shunt.

Figures 25, 26, and 27 are side, end, and vertical cross-sectional views respectively, of the rotor illustrated in Fig. 24, the vertical cross-section illustrated in Fig. 27 being taken along line A—A shown in Fig. 24.

Figures 28 and 29 are oblique views of a permanent magnet rotor provided with a magnetic shunt and of a protecting loop, the magnetic shunt itself being surrounded with an additional auxiliary loop. A portion of this auxiliary loop is illustrated in Fig. 28.

Figure 30:
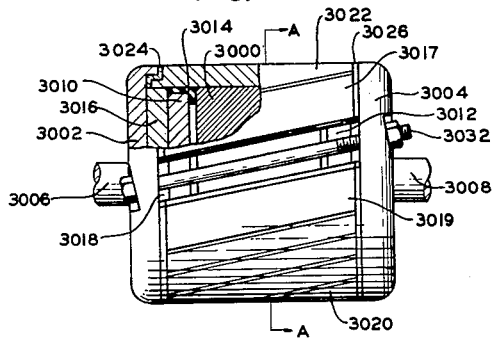

Figure 30 is a side view of a rotor with the upper left corner broken away and shown in a cross-sectional view to better illustrate the construction of this rotor, the rotor being equipped with two magnetic shunts and one magnet protecting loop.

Figure 31:
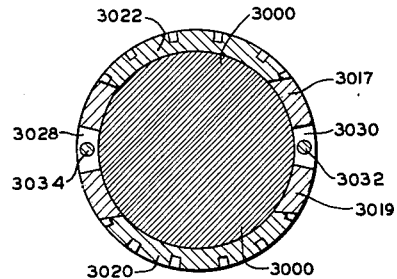

Figure 31 is a vertical cross-sectional view of a rotor illustrated in Fig. 30, the section being taken along line A—A shown in Fig. 30.

Figure 32:
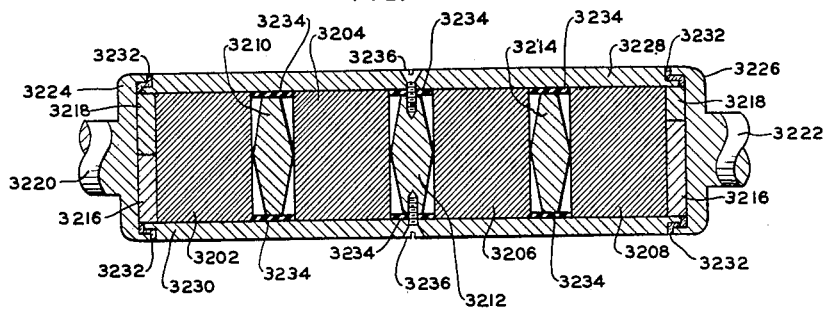

Figure 32 is a side view, with the left portion illustrated as a vertical section, of a rotor composed of a plurality of permanent magnets.

Figure 33:
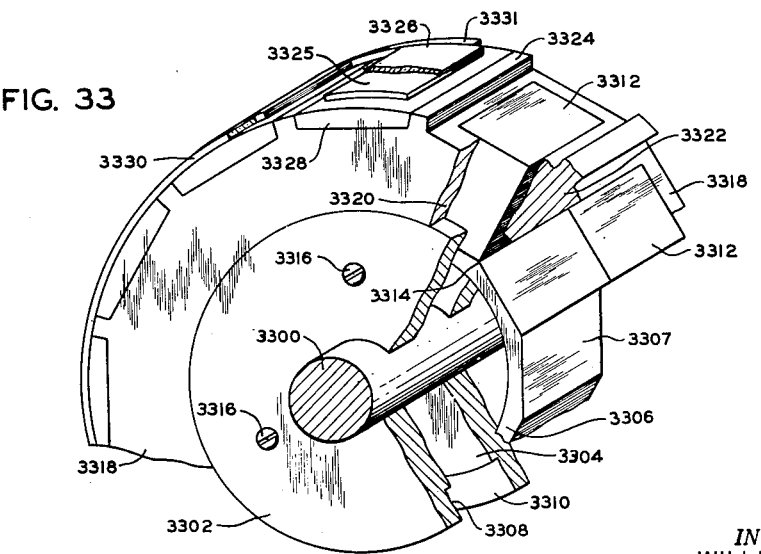
Figure 34:
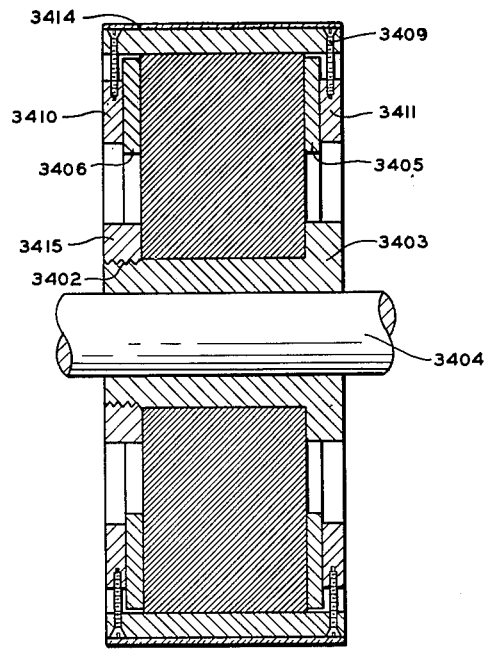
Figure 35:
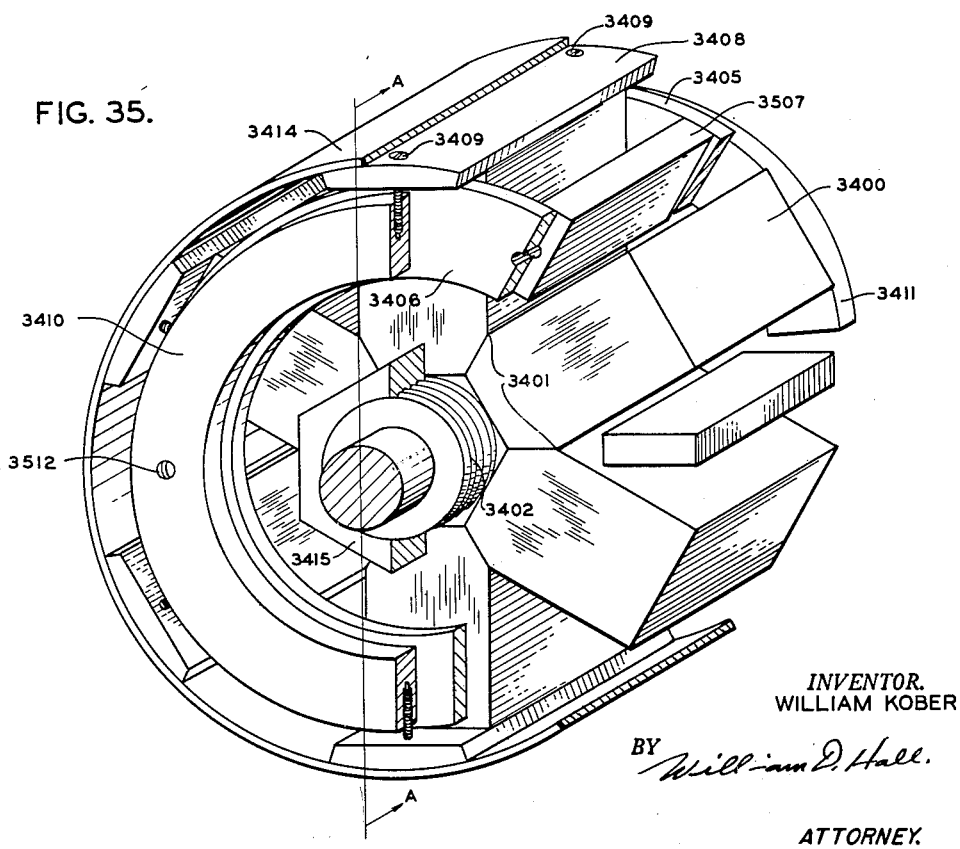

Figures 33 and 35 are oblique views of a partly broken away rotor for a polyphase machine provided with the magnet protecting loops and the magnetic shunts, and Figure 34 is the cross-sectional view of the rotor illustrated in Fig. 35.

Figure 36:
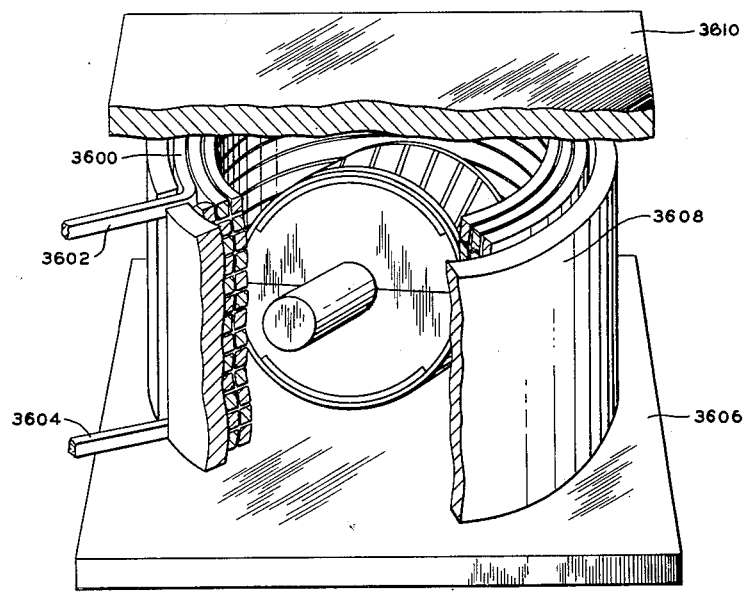
Figure 37:
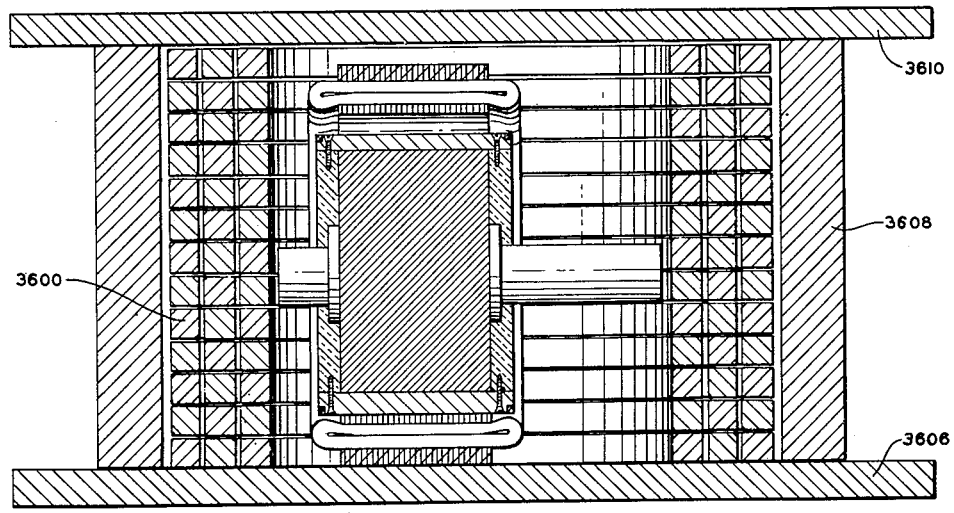

Figures 36 and 37 illustrate a magnetizer with a two-pole rotor in Fig. 36 and rotor-stator in Fig. 37 placed in the magnetizer.

In arriving at the solution of the previously enumerated objects, extensive experiments and studies were carried out with the view of arriving at a thorough understanding of electrical and magnetic factors encountered in permanent magnet machines under various operating conditions. The conclusions arrived at differ markedly from those generally accepted in the art in a number of important respects.

For the sake of clarity the specification has been subdivided into several subsections each of which deals with some specific phases of this invention; each section gives a rather extensive treatment of the basic principles relating to the specific subject of the section, which is followed by the discussion of the more specific objects of the invention, choice of materials and design factors, and is concluded with the description of the specific structures which conform with the conclusions reached in the light of the experiments and studies of the basic principles.

Since a considerable amount of the experimental work previously referred to was done in connection with a rotating field permanent magnet alternator, the sections that follow will deal principally with such a machine. The application of the principles discussed, however, to other types of generators and motors, and other magnetic devices, will usually be obvious from the disclosure given in connection with the permanent magnet alternator.

*Major cause of demagnetization of permanent magnet*

In the course of these experiments, it was discovered that the major part of the demagnetization of the magnet by short circuits, and hence the major part of the loss of output caused by "stabilization," was caused by the "transients" arising at the moment of a short circuit, and continuing for only a short time thereafter. The steady state short circuit condition was found to be relatively harmless. Both of these conclusions are diametrically opposite to those previously held by the art.

In order to explain clearly the structures used to substantially eliminate the effect of a generator short circuit upon the permanent magnet, an analysis of the transient electrical and magnetic conditions is necessary.

Figure 1:
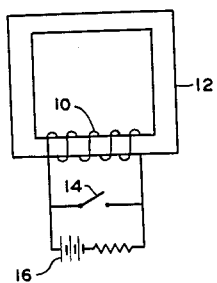

Referring to Fig. 1, suppose that a winding 10 of $n$ turns of wire having a total resistance $R_n$ is linked with a magnetic circuit 12 of an effective permeance P. To simplify the presentation, the winding of $n$ turns and resistance $R_n$ may be reduced to an equivalent single turn winding having a resistance R which is equal to $$R = \frac{R_n}{n^2} \text{ ohms}$$

This equivalent winding has the same total conducting cross section and the same length of the mean turn, and when short circuited, is identical with the actual winding of $n$ turns and resistance $R_n$.

The flux $\phi$ in the circuit 12 is given by $$\phi = 0.4\pi n IP = KI \text{ maxwells}$$

where $K = 0.4\pi nP$.

Suppose that in the above condition the two ends of the winding are now short circuited by closing a switch 14. The external potential source 16 that forced the current I through the winding no longer acts on the coil. It is desired to determine the current in the coil at any given time after the short circuit.

The voltage generated in the winding by changing flux is $$E = -\frac{d\phi}{dt} \cdot 10^{-8} \text{ volts}$$

and $E = RI$ volts

Since $\phi = KI$ maxwells $$E = -\frac{d\phi}{dt} \cdot 10^{-8} = -K\frac{dI}{dt} \cdot 10^{-8} = RI \text{ volts}$$

$$\frac{dI}{I} = -\frac{10^8 R}{K} dt$$

$$I = I_0 e^{-\left(10^8 \frac{R}{K}\right)t} \text{ amperes} \quad (1)$$

$$\phi = \phi_0 e^{-\left(10^8 \frac{R}{K}\right)t} \text{ maxwells} \quad (2)$$

Thus the current tends to retain its initial value, fading off logarithmically as time increases. It should be noted that for values of $t$ which make $$10^8 \frac{R}{K} t$$

small, the current I remains substantially at its original value $I_0$ and $\phi$ at its original value $\phi_0$.

Figure 2:
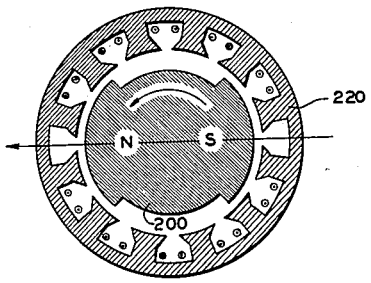

Reference is now made to Fig. 2, which shows an alternating current generator with a rotating field produced by a permanent magnet 200. The stator 220 is wound single phase in such a manner that the winding forms a coil having its upper side in the slots above the line N—S and its lower side below the line N—S. The magnetic axis of the winding is, therefore, horizontal.

It is assumed that the machine is running as a generator at no load. With the rotor 200 in the position shown, the instantaneous voltage generated is zero, and the stator winding 220 links all of the flux of the rotor, making allowance for the distribution factor of the winding. If a short circuit is placed on the machine terminals at this instant, the instantaneous flux $\phi$ flowing through the magnet circuit of the short circuited winding 220 may be computed by using Equation 2. In a certain 300 watt generator of this construction, $\phi_0 = 200{,}000$ maxwells
$R_n = 2$ ohms
$n = 244$ effective turns
$P = 50$ whence $$R = \frac{R_n}{n^2} = 3.36 \cdot 10^{-5} \text{ ohms}$$

$K = 0.4\pi P = 63$ and $\phi = 200{,}000 e^{-53t}$ maxwells

If the speed of the generator is 3,600 R. P. M., the time taken for the rotor to make a half turn is $\frac{1}{120}$ second. Ignoring the effect of the rotating vector representing the magnetic coercive force of the rotor during this half revolution, the field of the stator, at the end of this time is $$\phi = 200{,}000 e^{-\frac{53}{120}} = 200{,}000 \cdot 0.64 = 128{,}000 \text{ maxwells}$$

still in the original direction. This field, it will be seen, has the character of a shock or hammer blow, which persists (while decreasing logarithmically), until the energy of the coil and magnetic loop is spent. The permanent magnetism of the rotor, which has been ignored in the above approximate calculation opposes this field during the second quarter revolution, but this produces only a relatively minor effect, and it must be remembered that during the first quarter revolution of the rotor (the first $\frac{1}{240}$ second), the field of the permanent magnet is aiding the transient field $\phi$. In regard to the effect of the coercive force of the permanent magnet, if this were exactly opposed to the transient field from the very moment of short circuit, the flux linking the stator coil at the moment of short circuit would be 200,000 in a negative sense, while a long time after, when the coercive force of the magnet alone remained effective, it would be 200,000 in a positive direction. The total change would be twice 200,000 or 400,000 maxwell, and, therefore, for this condition the opposing flux is $$\phi = \left(-400{,}000 e^{-\frac{53}{120}} + 200{,}000\right) = -52{,}000 \text{ maxwells}$$

This instantaneous flux produced by the armature is still in the original direction, and its magnitude indicates that the coercive force of the magnet is feeble as compared to the force of this transient shock. Thus, the transient field will force flux of opposite polarity through the magnet and this will greatly reduce or even reverse the state of magnetization of the permanent magnet, as may be seen by examining the hysteresis curve shown in Fig. 9.

This analysis explains the very large drop in voltage of such machines when they are being "stabilized." The generator above described was observed to drop in terminal voltage from 150 to 60 volts when a perfectly cylindrical magnet was used. The reasons why the demagnetization was not even more severe than this may be found in the accidential presence, to a limited degree, of some of the factors that serve to protect the magnet, and in the fact that the path for the reverse flux does not traverse all the material in the magnet uniformly but tends to concentrate in certain places, mainly, toward the ends of the effective poles of the transient flux in the stator.

It should be noted that the above condition, where the short circuit takes place at a time when the generator terminal voltage is zero, is the most injurious. A short circuit taking place when the voltage is at a maximum finds zero flux linking the stator coil, and the necessary flux change is from 0 to 200,000 instead of from −200,000 to +200,000.

The above analysis of the causes of the demagnetization on short circuit serves to introduce the subject of protective structures to reduce this demagnetization substantially to zero.

Salient pole rotor

From Equation 1, it is seen that factor K, which is proportional to the effective permeability of the stator magnetic circuit (the latter including the rotor), appears in the denominator of the exponent of $e$; in other words, the lower the effective permeability of the magnetic circuit, the more quickly the transient disappears. If the rotor is cut away at the points between poles, as illustrated in Fig. 2, the effective permeability of the magnetic circuit is materially reduced during the periods when the rotor is approximately at right angle to its position in Fig. 2. In the machine described, when a perfect cylinder was shaped into the rotor shown in Fig. 2 and the pole sector was made approximately 100° wide with the cut-away sector approximately 80° wide and cut to ¼" depth, the terminal voltage after short circuit rose from 60 to 82 volts.

Figure 3:
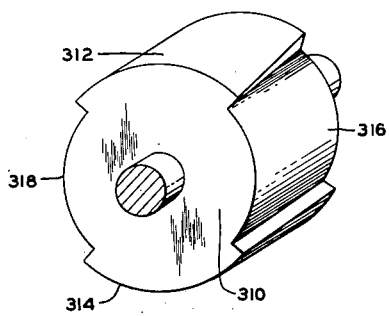
Figure 3 is an oblique view of a salient pole permanent magnet rotor.

This "salient pole" construction is illustrated more fully in Fig. 3. Here a salient pole rotor 310 is made entirely of permanent magnet material. Since the magnet material next to surfaces 316 and 318 of the permanent magnet 319 had been removed, there is a considerable increase in the reluctance of the magnetic circuit of the armature, and a corresponding reduction in the armature reaction flux.

In regard to the proportions of the pole areas 312—314 and the cut-away areas, the salient pole pieces should be capable of handling all the flux which the magnet is capable of developing. It is advantageous to keep the pole area no larger than is necessary to accomplish this obvious requirement of efficiency. The longer the cut-away portion, the longer is the portion of the magnet circuit which has the high reluctance of the cut-away portions, and the less the resultant magnetic circuit is capable of conducting the unwanted fluxes of armature reaction which causes voltage loss in the machine under load. It will be noted that the edges of the poles are skewed. This is done to prevent what is frequently termed stator tooth ripple, and functions in a manner well known to the art. In one of the machines worked on, the angular extent of the pole pieces was 97½°, leaving 82½° for the cut-away portions between the poles. The area of the pole pieces, as before explained, should cover enough stator teeth, each tooth having such an area that the iron is capable of handling the flux the magnet can produce, this last flux depending on the cross section of magnet material available, and upon the history of the hysteresis loop experienced by the magnet material in the process of placing it in operation in the machine.

When salient poles are used, it is often advantageous to make the pole pieces from magnetically "soft" iron. This material adjusts itself more readily to the unequal flux densities produced by the stator teeth; and because of the ease with which it may be machined, it may be readily supplied with damper windings which effectively reduce synchronous impedance in single phase machines, and it has other advantages that will become apparent later in connection with the structures of this invention.

Closed conducting loop linking permanent magnet

One of the methods of the invention for reducing the demagnetization caused by the transient shock provides a short circuited conducting loop fastened to the permanent magnet in such fashion as to link all of its flux. This condition requires a new calculation.

Figure 4:
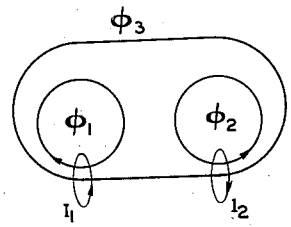

In Fig. 4, $\phi_1$ is the flux through the stator at the instant of the short circuit, as in the previous example, and $I_1$ is the current in the stator copper referred to an equivalent single turn. $\phi_2$ is the flux through the permanent magnet at the instant of short circuit (its normal flux), and $I_2$ is the current in the short-circuited conducting loop of the invention. To simplify the treatment, the rotor is supposed to turn 180° instantaneously, instead of taking 1/120 second; $\phi_1$ and $\phi_2$ are then opposed as shown by clockwise and counter-clockwise arrows. The entire flux, $(\phi_1+\phi_2)$, must flow through some leakage path in the actual machine, emerging axially between the stator winding and the magnet of the rotor. Such a path is limited in cross section so that its effective permeability is low.

With the stator without the conducting loop, $\phi_1$ would be forced through the permanent magnet in reverse direction to its magnetization. However, any attempt to change $\phi_2$, which is now linked by the conducting loop, will generate an opposing current $I_2$ in that loop in accordance with the Lenz's law. If $E_1$ is the voltage and $R_1$ the resistance of path $I_1$, and $E_2$ and $R_2$ are the corresponding quantities for $I_2$, then $$E_1 = R_1 I_1 = -\frac{d\phi_1}{dt} \qquad (3)$$

and $$E_2 = R_2 I_2 = -\frac{d\phi_2}{dt} \qquad (4)$$

all quantities being in c. g. s. electromagnetic units.

If the reluctances of leakage paths of $\phi_1$ and $\phi_2$ are $Q_1$ and $Q_2$ respectively, then $$4\pi I_1 = Q_1 \phi_1$$

$$4\pi I_2 = Q_2 \phi_2$$

Since $Q_1$ and $Q_2$ are high reluctance leakage paths, both $I_1$ and $I_2$ will be very large.

Substituting $$\frac{R_1 Q_1}{4\pi}\phi = -\frac{d\phi_1}{dt}$$

$$\frac{d\phi_1}{\phi_1} = -\frac{R_1 Q_1}{4\pi}$$

$$\phi_1 = \Phi_1 - \frac{R_1 Q_1}{e 4\pi}\cdot t \qquad (5)$$

$$\phi_2 = \Phi_2 - \frac{R_2 Q_2}{e 4\pi}\cdot t \qquad (6)$$

where $\Phi_1$ and $\Phi_2$ are the initial values of $\phi_1$ and $\phi_2$, and are, from the previous discussion, each approximately equal to the normal flux of the machine. The significance of the above equations is that paths $\phi_1$ and $\phi_2$ strongly resist any use as alternative paths in which the clashing fluxes of the rotor and stator may avoid direct conflict. The currents $I_1$ and $I_2$ are, therefore, forced into a short and violent dispute for the control of the main magnetic circuit of the machine, $\phi_3$. This clash may be compared to a head-on collision between two very rigid bodies. If the paths $\phi_1$ and $\phi_2$ had much lower values of reluctance $Q_1$ and $Q_2$, the clash would last over a much longer period and be much less violent, corresponding to a collision between bodies that are soft and springy. In the collision analogue, the final division of momentum between the bodies is not affected by their softness or hardness, and similarly, the final state of the flux $\phi_3$ in the main magnetic circuit is unaffected by the degree of violence of the clash. The magnitudes of the instantaneous currents $I_1$ and $I_2$ are, however, proportional to this degree of violence, just as the magnitudes of the stresses in the bodies at the moment of collision are proportional to the degrees of their rigidity.

The high degree of violence of the clash between $I_1$ and $I_2$, as it takes place in a machine of normal design, makes possible a simple and nearly accurate assumption: that during the clash, the magnetomotive forces developed in the stator winding by $I_1$ and in the rotor conducting loop by $I_2$ are very much greater than the normally present forces, namely the coercive force C of the magnet and the resistance of the magnetic circuit to this coercive force, $Q_3\phi_3$. However, in spite of this fact, since the flux change in the main magnetic circuit cannot be greater than $2\Phi_2$, it is obvious that no great resultant M. M. F. due to $I_1$ and $I_2$ ever operates in the path $\phi_3$. The M. M. F. in path $\phi_3$ at any time is given by M. M. F. in path $\phi_3 = 4\pi(I_1+I_2)+C=Q_3\phi_3$ This leads to the conclusion that although $I_1$ and $I_2$ are individually large, their sum is never larger than the order of magnitude of the normally present quantities C and $Q_3\phi_3$. Thus, $I_1+I_2$ is negligible as compared to $I_1$ and $I_2$ separately, and we may write $$I_1+I_2=0$$

and using Equations 3 and 4

$$\frac{1}{R_1}\frac{d\phi_1}{dt}+\frac{1}{R_2}\frac{d\phi_2}{dt}=0$$

$$\frac{d\phi_1}{R_1}+\frac{d\phi_2}{R_2}=0$$

integrating over the entire period of existence of the transient state $$\frac{\Delta\phi_1}{R_1}=\frac{\Delta\phi_2}{R_2} \quad (7)$$

or the changes in flux taking place under the stator and rotor windings are respectively proportional to the resistances $R_1$ and $R_2$ of the winding and the loop respectively, and opposite in sign. Thus, by using the conducting loop of sufficient cross-section, the change in flux in the permanent magnet may be made a small fraction of the normal flux. At a certain point this change may be equal to or less than flux reductions required by other manipulations of the magnet, and be harmless to the condition of the permanent magnet.

It has been noted that since $Q_1$ is large (and hence $Q_2$, because the available leakage path must be shared), very high currents $I_1$ and $I_2$ will flow during the clash or transient shock period. The former will produce minor local changes in the magnetization of the permanent magnet due to an encroachment of the leakage flux driven by these high M. M. F.'s upon the corners and more exposed portions of the permanent magnet. Hence, these minor injuries to the magnet will be reduced if a better leakage path exists, and these currents, though still large, are reduced.

It may be thus seen from the above discussion that the short-circuited loop represents an effective means for accomplishing No. 2 of the general objects outlined in column 3.

Equation 7 as derived does not include the eddy current paths already present in the material of the magnet pole pieces, etc. These assist the conducting loop, which can for this reason have a smaller cross section or higher resistance than that calculated by using Equation 7.

It should be remembered that Equation 7, and the above results based upon it, are only approximate. The main error lies in assuming an instant movement of the rotor through 180°. Actually the rotor moves at approximately its ordinary speed and the described operations take place in a sinusoidal transition from the starting position illustrated in Fig. 2 through one half of the revolution of the rotor. Numerous calculations giving better approximations are of course obvious to those skilled in the art, but for practical design purposes the above given results, multiplied by a correction factor depending on the specific structural design, will be found quite satisfactory. The factor is less than 1 because the eddy currents in the body of the magnet, pole pieces, etc., and the time of about $\frac{1}{120}$ second (for a 60-cycle generator) of the transition to opposition of stator and rotor fluxes are all in favor of the retention of magnetism by the permanent magnet.

Figure 9:
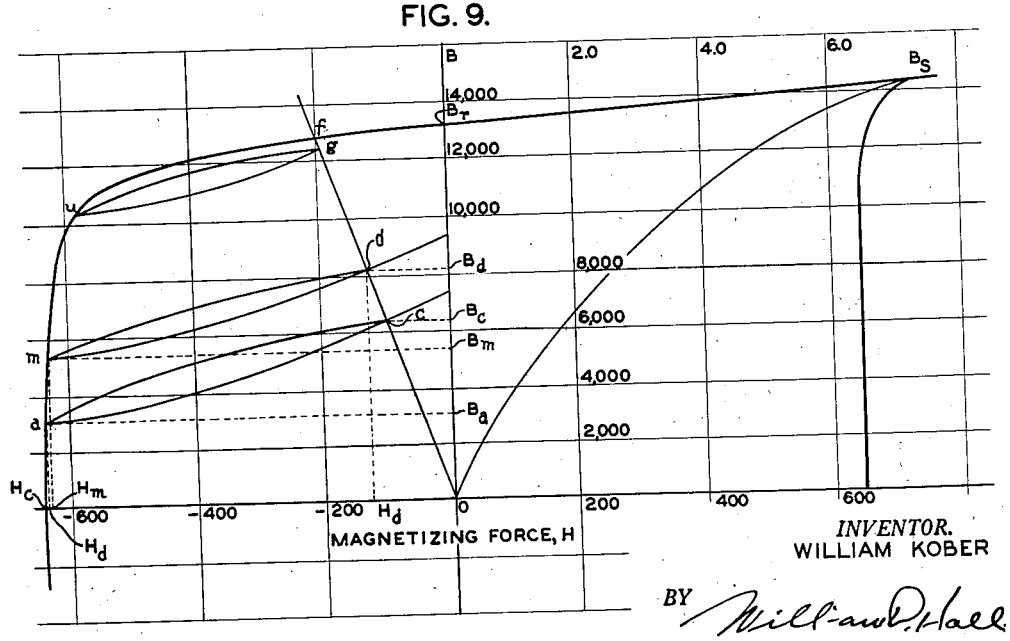
Figure 9 is a typical hysteresis loop for an "Alnico V" permanent magnet material which is used in the rotors of this invention.

The application of this equation to several design problems will be discussed in detail at a later point in the specification. At this time, however, some examination of the meaning of this equation in terms of a practical application is necessary. Referring to Fig. 9, suppose that the permanent magnet field installed in its armature operates at point $d$ at no load for the generator. The magnet material then works on the minor hysteresis loop $md$, provided that a demagnetizing force greater than $H_m$ is not subsequently applied. Here point $m$, of course, represents the maximum demagnetization to which the magnet, in its previous history, was subjected. This maximum demagnetization may have been encountered in the transportation of the permanent magnet through the air from the magnetizer to the generator assembly, or by steady state armature currents, or some other reason. No transient shock is, however, considered to have taken place during this history.

It is obviously desirable to limit the demagnetizing effect of transient shock to this same point or less, and if this is done, no loss of machine performance due to transient shock can take place. Actual generators, in sizes from 100 watts to 12,500 watts, built in accordance with the structures which will be described subsequently, have been tested, and in every case the terminal voltage as measured immediately after assembly suffered no perceptible loss after the application of any number of full short circuits.

It is obvious from Fig. 9 that if the minor hysteresis loop $md$ is to be retained after the severest possible transient shock, the change in flux of the magnet must be no greater than $B_dB_m$.

The flux change in the magnet, protected by its effective resistance loop $R_2$ (see Equation 7) is then to be limited to $B_d-B_m$, and the consequent change in the armature, protected by its winding, of effective resistance $R_1$, is $B_d+B_m$. Hence, substituting in Equation 7 the relation $$\Delta\phi_1=B_d+B_m$$
$$\Delta\phi_2=B_d-B_m$$
$$\frac{R_2}{R_1}=\frac{B_d-B_m}{B_d+B_m} \quad (7\text{-}A)$$

All design considerations except that of the transient shock call for making $B_m$ as high above zero as is possible. It is thus obvious that, in general, the effective resistance of the conducting loop, $R_2$, is to be much smaller than the effective resistance of the armature windings, $R_1$, if full protection from the transient shock is to be obtained; or, to put it another way, if the benefits of good magnetic structure design in other respects are not to be rendered worthless. It will frequently be necessary to make $R_2$ many times smaller than $R_1$ to obtain the desired complete protection against transient shock, which means the use of a conducting loop of correspondingly heavy cross-section.

It must be emphasized here that at the basis of this invention is the understanding that it is the transient shock which is the really destructive force when the machine is short-circuited. This understanding leads to the discovery that the above discussed very heavy, low resistance conducting loops are necessary for proper protection of the magnet.

It is necessary to mention here that the coducting loop has a moderate effect to minimize the demagnetizing force of steady state armature currents upon the magnet. At heavy, low power factor inductive loads (of which the worst case is usually short circuit of the machine terminals), the armature reaction is, of course, demagnetizing. As is well known, this demagnetizing force has the same form as the wave form of the current, which may be taken as approximately a sine wave. The peak of the current is thus $\sqrt{2}$ or 1.41 times as great as its R. M. S. or effective value. Thus, the actual peak demagnetizing force of the steady state armature currents is $\sqrt{2}$ times as great as the value calculated by multiplying effective armature turns by the R. M. S. current value. A short-circuited loop placed around the magnet will tend roughly to average this demagnetizing force over a half-wave of the current, chopping off the peak and filling in the low points. The average value of current is well known to be $$\frac{2}{\pi}\sqrt{2}$$

or 90% of the R. M. S. value. Thus, the loop is effective to reduce the demagnetizing force of steady state armature currents to approximately $$\frac{2}{\pi}$$

or approximately 64% of its value without a loop. A conducting loop of small cross section, or of effective conductivity much less than that of the effective armature winding, is usually capable of effecting the major part of this improvement, but no matter how heavy a loop is applied, the above value of approximately 64% is a limit that cannot be exceeded. (At a latter point in the specification, a more complete analysis of this phenomenon will be given, and a slightly different value (50%) rather than 64% as obtained by the above rough analysis will be seen to apply. Actually, depending on the degree of distribution of the armature winding, a given machine may have some value in the range between 64% and 50% for this factor. This value, then, is the one that cannot be improved upon no matter how heavy the short-circuited turns are made.)

The above discussed effect of a conducting loop upon the demagnetizing effect of steady state armature currents has been known to the art for a long time.

Thus the prior art has in a number of cases applied short-circuited turns to field magnets, an example being U. S. Patent 2,078,805 of April 27, 1937, to F. W. Merrill. The illustrated concepts of the art lack the realization of the importance of the transient shock as well as of the fact that a conducting loop having a cross section heavier than a given critical value is competent fully and entirely to combat it. They aim to secure only the limited reducing or minimizing action upon the steady state armature reaction above discussed, and show in their loops only the small conducting cross sections which, although competent to achieve the desired effect upon steady state demagnetization, are quite inadequate to cope with the enormously greater demagnetizing forces appearing during the transient period.

To clarify the concept of the "effective resistance" of the armature winding, as used in connection with the Equations 7 and 7–A the following point of view is helpful. The actual winding will be, in the general case, a polyphase winding, with the coils of each phase distributed in a number of slots, and having a range of coil pitches. For a given position of the field structure the winding of each phase will have a certain number of flux linkages, which is the quantity calculated from the flux linking each turn, summed over all the turns of the phase.

The above linkages are then reduced to such a number of turns, each linking all the flux of the field structure in the chosen position, as will give the same number of linkages as the actual distributed winding.

Let this number be $n$, then if R is the D. C. resistance of the actual winding of the phase, between terminals, the "effective" resistance for that phase, and for the given chosen position of the field structure, is $$\text{effective resistance } \frac{R}{n^2}$$

Corresponding to this effective resistance, is its reciprocal, the effective conductance of that phase.

If all the phases are to be subjected to short circuit simultaneously, the total effective conductance of the phases is the sum of the conductances of the individual phases.

If only a part of all the phases are to be short-circuited, the total effective conductance is the sum of the effective conductances of the short-circuited phases only.

It may be that the above resulting calculation has different values, depending on the position chosen for the field structure in making the analysis. The worst transient shock will be encountered if the short circuit takes place at the moment when the field structure has the position giving the maximum effective conductance, so that this greatest result should be chosen.

The maximum effective conductance, so calculated, is the desired quantity; and, of course, the effective resistance of the winding is its reciprocal.

The third general object of the invention is to reduce the "regulation" of a generator, or to reduce the change in terminal voltage caused by changes in load. As is well known, the output voltage of a generator may be represented as the output from a source of constant voltage at the operating frequency coupled to the load through an impedance termed the "synchronous impedance" of the generator. This impedance is composed mainly of the D. C. resistance of the winding, and the leakage reactance of the winding.

The fluxes of armature reaction produce additional losses, adding to the winding resistance, and additional reactance adding to the leakage reactance of the winding. These latter terms tend to vary with changing loads, but the representation of the totatls as "effective resistance" and "effective reactance" is a satisfactory approximation for most practical purposes.

Thus, the problem of making a machine with a low inherent regulation narrows down to that of keeping the maximum effective resistance R and the maximum effective reactance X as small as possible. A brief survey of the relative effects of R and X will be helpful at this point.

In addition to the above-defined R and X, let $\omega$ be the angular frequency, L the leakage inductance, V the terminal voltage when there is a load current I, and E the no load terminal voltage. The quantities R, X, L, V, E and I are either scalar or vector, according to the notation at the left of each equation or term.

Vectorially, $V = E - (R + j\omega L)I$

It is of interest to compute in detail the difference in magnitude between E and V, or the voltage drop, in the special case of a unity power factor load. In this case, the load impedance Z is pure resistance, and therefore, vectorially and in magnitude $$V = ZI$$

also, vectorially $$E = [(Z+R) + j\omega L]I$$

and in magnitude $$E = I\sqrt{(Z+R)^2 + \omega^2 L^2}$$

Hence the magnitude of change in terminal voltage is $$E - V = (\sqrt{(Z+R)^2 + \omega^2 L^2} - Z)I = ZI\left[\sqrt{\left(1+\frac{R}{Z}\right)^2 + \frac{\omega^2 L^2}{Z^2}} - 1\right]$$

If RI and LI are small compared to V (and hence ZI), as they normally are, then the terminal voltage drop at unity power factor may be simplified as follows:

$$\text{Voltage drop} = ZI\left(\sqrt{1 + \frac{2R}{Z} + \frac{R^2}{Z^2} + \frac{\omega^2 L^2}{Z^2}} - 1\right) =$$

$$\text{approximately} = ZI\left(1 + \frac{R}{Z} + \frac{R^2 + \omega^2 L^2}{2Z^2} - 1\right) =$$

$$\text{approximately} = I\left(\frac{R + R^2 + \omega^2 L^2}{2Z}\right)$$

$$\text{approximately} = IR + \frac{I^2}{2V}(R^2 + \omega^2 L^2) \quad (8)$$

In normal generators, R is usually smaller than L, so that roughly the armature voltage drop =

$$IR + \frac{(I\omega L)^2}{2V} \quad (9)$$

Thus, even at unity power factor load, the leakage reactance contributes toward the drop of terminal voltage with load, and the effect varies as the square of $I\omega L = IX$.

For a given type of winding, the effective leakage reactance X is proportional to the square of the number of armature winding turns. Since an increase in the total flux of the field causes a proportional decrease in the number of turns required for a given terminal voltage, an increase in this flux by a factor M will change the leakage reactance by a factor of $$\frac{1}{M^2}$$

The part of the drop at unity power factor due to the reactance of the winding is therefore inversely proportional to $M^4$. This serves to illustrate the great importance of designing a machine with a high field flux if good regulation is desired.

The resistance R, similarly calculated, is inversely proportional to the square of the total field flux.

The effective leakage inductance L of the machine may also be reduced in other ways, even with the field flux unchanged. Two of these are of special importance, but other means known to the art may of course be employed.

First, the operation of the stator teeth and tooth tips at saturation helps to reduce the leakage flux linking the conductors by presenting a less permeable path to these fluxes. The losses in the machine are, of course, increased by this expedient.

Second, in the case of single-phase generators, the stator teeth and the pole faces form a path of high permeability, with only two air gaps (the stator to rotor gaps), and this greatly increases the tooth leakage flux, even causing effective linkages between conductors in different slots. This effect is not present to any great degree in balanced polyphase generators, since here the armature flux is nearly a true rotating vector, of constant amplitude, and each point on the pole face is under the influence of a constant magnetomotive force due to armature reaction; as a consequence, there is no fluctuation of leakage flux in the air gap.

In single phase machines, a similar result may be obtained by the use of pole face dampers. Because of the importance of these dampers in securing good regulation from single phase generators, and because of the existence of important theoretical and practical differences between the performance, functions, and structures of the magnet-protecting coil and the damper windings, the action of such a damper in a single phase machine will now be investigated.

In the diagram, Fig. 4–A, a pole face M is illustrated. B is the vector representing the mechanical position of the rotor which is obtained by drawing a line from the center of the rotor to the center point of the pole face M. P is the direction to any point of the pole face, making an angle X with B (taken positive when P leads B in the direction of rotation). The axis of the armature winding is horizontal, so that the instantaneous armature current, $i$, and the M. M. F. of the armature current $Ki$, will always be horizontal, the machine being a single phase machine. Here K represents a factor involving the pitch, type of winding, number of turns, etc., of the armature winding. The instantaneous phase of the vectors B and P is defined by the angle $\omega t$, which is measured from the horizontal axis. The instantaneous armature current $i$ is represented by the horizontal component of a conventional electrical vector C at an angle $(90° + \psi)$ to the vector B which represents the mechanical position of the rotor. Caution must be observed in using this representation, as B and P are linear distances, and hence true vectors, while C is not a true vector, but merely represents the phase of the current. The angle $\psi$ depends on the power factor of the external load on the generator, and also on the resistance and leakage reactance of the generator windings. The direction of the instantaneous current, $i$, is always along the horizontal axis.

Let $f$ be the magnetomotive force at any point P on pole face at the time $t$, and let F be the constant magnetomotive force of the field structure, i. e., of the permanent magnet. The component of the armature reaction M. M. F., $Ki$, along OP in a magnetizing direction is $$Ki \cos (\omega t + x)$$

and since $$i = I \sin (\omega t - \psi)$$

where I is the magnitude of the current vector, $$f = F + KI \cos (\omega t + x) \sin (\omega t - \psi) =$$
$$F + \frac{KI}{2}[\sin (2\omega t + x - \psi) - \sin (x + \psi)] \quad (10)$$

Thus, the effect of the armature reaction is composed of two parts, one a double frequency term $\sin (2\omega t + x - \psi)$, and the other term, $\sin (x + \omega)$ independent of frequency. The double frequency term is readily identified with a flux which enters the pole pieces at their leading portions and emerges from their lagging portions. In a machine without a pole face damper, both types of reaction exist. If a damper is added, current will flow in the damper bars in such a way as to hold flux at each point of the pole face constant independent of time. If the dampers are sufficiently heavy, all double frequency and hence time-dependent terms will substantially disappear. Thus, with a damper $$f_d = F - \frac{KI}{2} \sin (x + \psi) \quad (11)$$

where $f_d$ is the M. M. F. at any point P on the pole face M when the pole face is equipped with a damper winding Thus, the damper acts on only a part of the whole armature reaction, the term $\sin (x + \psi)$ being unaffected as long as I remains constant. The paths of leakage reactance, however, are substantially blocked.

It is of great value to determine the cross section of a damper winding necessary to secure a good approximation to the ideal damper winding assumed above, when complete suppression of the double frequency term was obtained.

Consider a path for this flux of double frequency caused by armature reaction. This path passes through the armature iron, into the air gap, into the pole face, emerges from the pole face at another point into the air gap, recrosses the air gap into the armature iron and completes the circuit. This path consists of two similar parts, each one including armature windings producing a magnetomotive force, an air gap, and a damper loop. The two parts are similar, and hence for simplicity a single part only need be considered.

Assume that a certain path of this type has an effective permeability $\rho$, is linked by $I_1$ armature reaction ampere turns, and is also linked as it passes into the pole face by a damper loop having an effective closed single turn of resistance R. The problem is the same as that of a transformer whose magnetic circuit has a permeability $\rho$, a primary consisting of a single turn with current $I_1$, and a short-circuited secondary consisting of a single turn having resistance R. A current of $I_2$ is induced in this secondary turn by the voltage E generated in it by the alternation at angular frequency $\omega$ of the flux $\phi$ (root-mean square value).

The following relations are obvious $$\phi = .4\pi\rho(I_1 + I_2)$$

$$-E = \frac{d\phi}{dt} \times 10^{-8} = .4\pi\rho \times 10^{-8}\left(\frac{dI_1}{dt} + \frac{dI_2}{dt}\right)$$

$$E = RI_2$$

$$-MI_2 = \frac{dI_1}{dt} + \frac{dI_2}{dt} \quad (12)$$

where $$M = \frac{R}{.4\pi\rho \times 10^{-8}}$$

This differential equation may be solved for sinusoidal currents and fluxes by substitution of the assumed values $$I_1 = a \sin (\omega t + \theta)$$
$$I_2 = b \sin \omega t$$

performing the substitution, and collecting the coefficients of $\sin \omega t$ and $\cos \omega t$, $$\sin \omega t (Mb - a\omega \sin \theta) + \cos \omega t (\omega b + a\omega \cos \theta) = 0$$

Since the result is zero at any value of $t$, the coefficients of both $\sin \omega t$ and $\cos \omega t$ must each be zero, whence $$Mb = a\omega \sin \theta$$
$$\omega b = -a\omega \cos \theta$$

Solving for $\theta$, $$\tan \theta = -\frac{M}{\omega}$$

and solving for $$\frac{a}{b}$$

$$\frac{a}{b} = -\sqrt{1 + \left(\frac{M}{\omega}\right)^2} \quad (13)$$

Thus, $I_2$ leads $(-I_1)$ by the angle $\theta$, and the ratio of the magnitudes of $I_1$ to that of $I_2$ is $$\sqrt{1 + \left(\frac{M}{\omega}\right)^2}$$

Expressed in the usual vector notation, we, therefore, have $$I_2 = \frac{-I_1}{1 - j\frac{M}{\omega}} \quad (14)$$

Since $E = RI_2$, the effective impedance $Z_e$ referred to the primary of the transformer is $$Z_e = \frac{RI_2}{I_1} = -\frac{R}{1 - j\frac{M}{\omega}} = -R\frac{\left(1 + j\frac{M}{\omega}\right)}{1 + \left(\frac{M}{\omega}\right)^2} \quad (15)$$

Thus $Z_e$ has a resistance $$\frac{R}{1 + \left(\frac{M}{\omega}\right)^2} \quad (16)$$

and a reactance $$\frac{\frac{RM}{\omega}}{1 + \left(\frac{M}{\omega}\right)^2} \quad (17)$$

the two elements being in series. This is, of course, the resistance and reactance contributed by induction in the pole faces due to armature reaction.

The effective resistance term is connected with the power loss in the field pole faces under load. Because the effective frequency (see Equation 10) is twice the machine frequency, it does not appear directly as an increase in the effective resistance in the armature winding, instead, the bulk of the pole face loss is extracted from the harmonics, principally the third, which appears in the generated wave form when armature current flows. A full discussion of pole face loss is complex, and not of special interest in connection with the invention.

The effective reactance term $$\frac{\frac{RM}{\omega}}{1+\left(\frac{M}{\omega}\right)^2}$$

is of great interest, as it shows how that part of the reactance of the armature winding which is due to leakage flux paths that enter and leave the pole faces is affected by the presence of the pole face damper. It should be remembered that M contains R as a direct factor, so that this term, when $$\frac{M}{\omega}$$

is smaller than unity, is approximately proportional to $R^2$, R, of course, being the effective resistance of a damper current path referred to a single turn on the armature. Since (see Equation 10) the armature reaction KI is only one half effective in the double frequency term, this factor must be remembered in calculating the actual reactance in the actual winding. The angular frequency $\omega$ in this expression must also be chosen at twice that of the generated voltage.

It is easy to show from the above expression for effective reactance due to these flux paths entering the pole face, that if $X_0$ is the reactance from this source without a damper, this reactance, with a damper, is expressed by $X_d$ where $$\frac{X_d}{X_0}=\frac{\frac{M}{\omega}}{1+\left(\frac{M}{\omega}\right)^2} \quad (18)$$

If $$\frac{M}{\omega}$$

is less than ⅓, this gives a reduction to less than 1/10 the original value.

The cross section of the damper conductor so calculated varies inversely with the generated frequency and directly with the width of the air gap between field and armature, and even at 60 cycles, is normally much smaller than the cross section of the armature winding. The fundamental differences between this design for the damper and that of a magnet-protecting conducting loop are thus obvious.

It will be noted that the short-circuited loop that protects against transients is entirely ineffective upon fluxes that go into one part of the pole face, and emerge from the other. The conducting loop of the invention is, therefore, effective only to protect the magnet according to the methods of the invention, and performs a function of its own, in fact, it cannnot produce the type of action a damper is intended for. It is thus necessary to use both the conducting loop and the pole face damper if the desirable effects of each are to be obtained, as is the case in a number of the forms of the invention. It is true that the outermost bars of the damper may be looked upon as being almost as effective, section for section, as the conducting loop, although the inner bars are very nearly ineffective. However, even the outer bars, for the reasons that follow, have so small a section that their actual contribution is negligible.

Since the damper bars must appear on the faces of the field poles, they must obviously interfere with the effective area presented at the air gap, and hence it is desirable to keep them as small as is consistent with effective performance of their specific duty, as previously computed. This necessary size is very much smaller than that required for effective protection of the magnet against transients, just as the armature reaction in the steady state is very much smaller than the transient shock. On the other hand, the material effective against the transient shock is most effectively placed in the spaces between the poles, where it is almost entirely non-interfering with desirable flux path considerations.

*Permanent magnet rotor with a conducting loop*

Figure 6:
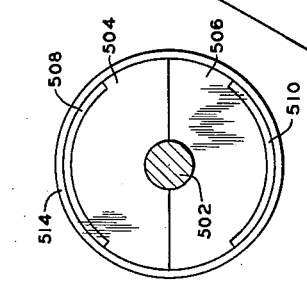
Figures 6 and 7 are the assembled front and side elevational views respectively of Fig. 5.
Figure 5:
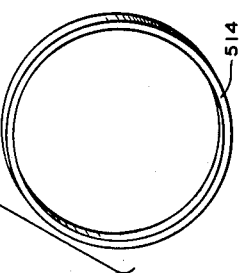
Figure 5 is an exploded oblique view of a salient pole permanent magnet rotor equipped with soft iron salient pole pieces and a conducting loop for resisting the demagnetizing effects of the armature.
Figure 7:
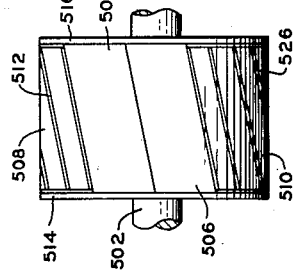

Proceeding now with the description of the specific structures which embody the theoretical principles outlined above, Figs. 5, 6, and 7 illustrate one form of a permanent magnet rotor with the closed conducting loop linking the magnet. Fig. 5 is an exploded oblique view of the rotor; Fig. 6 is an end view, and Fig. 7 a side view of the same rotor in an assembled form. The illustrated rotor is provided with soft iron pole pieces equipped with the damper windings. The cylindrical permanent magnet 500 is mounted on a shaft 502, made of nonmagnetic material, and the magnet-protecting conducting loop, consisting of two members 504 and 506, normally clamps over the permanent magnet as illustrated in Figs. 3 and 4. Two detachable salient poles 508 and 510, made of soft iron having high permeability and very low retentivity, are equipped with damping windings 512 and 526, which are used for their usual purpose, i. e., for reducing the leakage reaction of the armature. The pole pieces have a conventional skewed form for improving the wave form of the generator; therefore, loops 504, 506, which match the pole pieces, also assume a skewed form. When the soft iron pole pieces 508, 510, and the copper loop pieces 504, 506 are mounted over permanent magnet 500, the entire assembly assumes a cylindrical form as illustrated in Figs. 6 and 7. This assembly is held together mechanically by means of rings 514, 516 of high strength material shrunk or forced onto grooves 507, 509, 511, 513, 518, 520, 522, and 524, provided in the copper loop and soft iron pole pieces for this purpose. The rings should obviously have an initial tension sufficient to hold the pole pieces in intimate contact with the magnet at the highest speed at which the rotor may be turned. Otherwise, the pole pieces, or the copper, will gradually spring away from contact with the magnet as it is rotated more rapidly with adverse effects upon the constancy of the character of the machine, and the possible danger of rubbing against the stator.

Although Figs. 5 thru 7 illustrate a preferred form of the invention, it is obvious that a shorting loop 504, 506 may be impressed directly on the permanent magnet illustrated in Fig. 3 in which case the combination consists of a single piece salient pole permanent magnet with a shorting loop mounted in the recesses formed between the salient poles.

Figure 8:
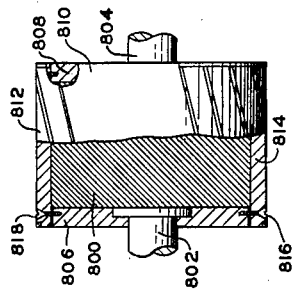
Figure 8 is the assembled view partly in section and partly a side elevational view of a modified version of the salient pole permanent magnet rotor disclosed in Figs. 5 through 7.
Figure 4A:
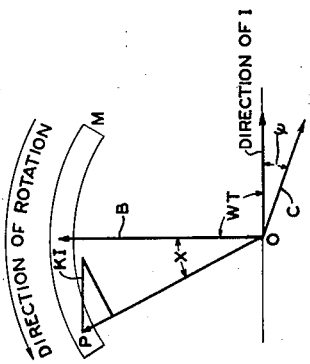

Another modification of Figs. 5 thru 7 is illustrated in Fig. 8. In Figs. 5 thru 7, the permanent magnet 500 has been shown with a shaft of nonmagnetic material cast into it, or otherwise placed through the horizontal axis of the permanent magnet. This shaft obviously reduces the effective cross section of the magnet, and introduces discontinuities and irregularities in the flow of fluxes. It should be further noted that the lost cross section of the magnet is taken from that portion where this cross section has the least weight. Figure 8 shows a construction in which the central bore through the permanent magnet cylinder has been eliminated so that it appears as a solid cylindrical piece 800. Since shaft pieces 802 and 804 do not pierce the permanent magnet cylinder any longer, they are now mounted in the side discs 806, 808 of the protecting loop, which now consists of two side discs 806, 808, which have only slightly smaller diameter than the diameter of the permanent magnet, and two cross bars which join the side discs, one of which, i. e., bar 810, is illustrated in Fig. 8. The rotor is equipped with the soft iron pole pieces 812, 814, as in the case of Figs. 5 through 7, but the side rings which are used in Fig. 5 for holding the entire assembly together have now been eliminated, and the soft iron pole pieces are now fastened to the side discs 806, 808 of the protecting loop by means of set-screws 816, 818. These screws may be supplemented or replaced by welding or brazing. This structure may be conveniently assembled in the following manner: shaft pieces 804 and 802 are permanently secured in the discs 806, 808 in any well known manner, such as by spot welding or brazing, or being made from one piece by casting, machining or forging, and the two pieces 810 of the copper loop are then brazed to side disc 808. This partially assembled copper loop is then mounted on permanent magnet 800, and the opposite ends of the pieces 810, or the ends which are now in contact with the side disc 806, are brazed together. This completes the assembly of the copper loop, and the only remaining step consists of mounting the soft iron pole pieces 812, 814 in the recesses that are provided for them between the copper loop pieces 810. This latter step is accomplished by slipping the iron pole pieces into these recesses and finally tightening the setscrews 818, 816. As above noted, the pole pieces may be brazed to side discs 806, 810, eliminating the need for set screws 816, 818.

*Magnetic shunt*

Another method of the invention is capable of furthering object No. 1 as well as object No. 2. This method will be termed the "magnetic shunt." Its application to object No. 1 will be described first.

Fig. 9 illustrates a magnetization curve for "Alnico V." Let one cubic centimeter of this unmagnetized material be placed in a magnetizer and a current passed through the magnetizer to produce at least 2,000 ampere turns. The magnet material follows a saturation curve from the origin to point $B_s$ or beyond. The current is now turned off, and the state of the magnet material moves from $B_s$ to $B_r$, since only a small M. M. F. is required to keep this flux flowing through the low reluctance of the magnetizer iron path. As the magnetizer iron path is opened and air gaps appear, the reluctance of the path increases, and the magnet must develop a coercive force to maintain its flux at a value above zero. The magnet now follows curve $B_r$—$f$—$m$ until it is finally completely clear of the magnetizer iron path, and is free in the air. This corresponds to point "a" on the curve with an ordinate $B_a$ and an abscissa $H_a$. The relation between $B_a$ and $H_a$ depends on the shape or "dimension ratio" of the magnet, point "a," within certain limits, being higher up on the curve the longer is the magnet. If this magnet is now put back in a low reluctance magnetic circuit, it will not return along the major hysteresis loop $a$—$m$—$f$—$B_r$, but will follow the lower line of a minor hysteresis loop $a$—$c$. The magnet may now be removed from the magnetic circuit into air, and it will follow the upper line of the loop $a$—$c$. In the langauge of the art, the cubic magnet has been "stabilized against demagnetization in the air." This has been done at the expense of the working flux which now has been reduced from $B_r$ to about $B_c$.

If the above magnet were made 2 cm. long, while retaining a cross section of one square centimeter, the shape would produce a different ratio of flux to coercive force in air, and the magnet would assume some higher state "$m$" on the magnetization curve with the new minor hysteresis curve $m$—$d$. The loss of flux from $B_r$ to $B_d$ is obviously less than from $B_r$ to $B_c$ so that this shape of magnet will have a higher working flux density than the cubic magnet.

All of this merely describes what is known in the art, which recognizes the importance of the dimension ratio.

Requirements of space and design, however, may place a premium on a short magnet of relatively large cross section which must be subjected to full air demagnetization at some point in the history of the assembly of the device. The art either asks for a very large cross section of magnet, so that the desired total flux can be produced in spite of the low unit flux available from the low flux density minor hysteresis curve which the dimensions of the magnet yield or else forfeits the design premium and puts in a much longer magnet. Often neither solution is a good one, and electromagnets are finally used in spite of the fact that the available permanent magnet material has an "available" energy per unit volume on the "major hysteresis loop" which is far greater than the requirements of the design.

The invention points a better solution to this problem than those known to the art. Let it be assumed that design requirements call for a cubic centimeter magnet having a flux density well above $B_c$, but which must be removed into the air. The invention provides a composite structure, partly of magnet material, and partly of iron or other ferromagnetic material. The overall dimensions of the structure remain one cubic centimeter, but it can be removed into the air, clear of all paramagnetic objects, and yet supply a flux well above $B_c$ when returned into its working environment.

In a simple form of the invention illustrated in Fig. 10–A, a magnet of 1 cm. length and width, but of breadth less than 1 cm., is lined with two side iron plates 1002, 1004 applied to two sides of a magnet 1006 to fill out the final dimensions to the centimeter cube. If this structure is magnetized and removed into air, the low reluctance leakage paths provided by the iron sides will cause the magnet material to operate on a more favorable minor hysteresis loop. Unless the leakage paths provided by the iron sides are very heavy, the properties of "Alnico V" are such that the coercive force between the top and bottom of the magnet is hardly reduced. The amount of flux still flowing in the air path is, therefore, not much changed from that for a solid magnet.

As the structure is returned to its working environment, which usually has a fairly low reluctance, the effective coercive force of the magnet drops greatly. The leakage into the iron plates drops in proportion to the coercive force available, and will frequently become a relatively unimportant parasitic loss. Thus, if the improvement in the minor hysteresis path exceeds the loss of actual magnet cross section, the composite structure will outperform a solid magnet of the same size and shape.

A more effective structure but accomplishing the same result is illustrated in Fig. 10-B, where the permanent magnet 1010 is surrounded by the magnetic shunts 1011, 1012, 1013, and 1014 on four sides of the magnet. The distance the flux must flow through the permanent magnet material, and also the distortion in direction of the flux paths, is reduced in the form of Fig. 10-B over that of Fig. 10-A.

The magnetic shunt principle can be further clarified by a few simple calculations based on approximations from the curves for "Alnico V." Thus, it is assumed that the material has a coercive force of 600 units up to a flux density of 10,000 lines, and that the slope of a minor hysteresis loop, or "differential permeability," is 3. This is a good approximation to an actual curve. It is also assumed that in the working environment, the magnet structure of the invention develops a fraction "$a$" of the 600 units per centimeter of coercive force available in the air. Let the flux density in a solid magnet of the same dimensions as the structure, when in air, be $B_a$. The solid magnet would then produce the following flux per unit area in its working environment:

$$B_a + (1-a) \cdot 600 \cdot 3 = B_a + (1-a) \cdot 1800 \; \frac{\text{lines}}{\text{cm.}^2} \quad (19)$$

Let it be assumed that the composite structure reduces the magnet cross section in the ratio $C$, but, when free in the air, produces an increased leakage of $$18,000 \, (1-C) \; \frac{\text{lines}}{\text{cm.}^2} \quad (20)$$

where 18,000 is a reasonable saturation value for iron which, in this example, replaces the cross section removed from the magnet. Suitable air gaps to obtain the desired density of 18,000 lines/cm. in the iron from the available coercive force of 600 units are assumed. Then, for the composite structure, the flux density in the magnet material when in the air is $$\frac{B_a + 18,000 \, (1-C)}{C} \quad (21)$$

When this is placed in its working environment, the new density in the magnet material is $$\frac{B_a + 18,000 \, (1-C)}{C} + (1-a) \cdot 1800 \quad (22)$$

This is not all useful flux, as the cross section of the magnet material is reduced in the ratio $C$, and leakage through the iron path amounts to $$1,800 \, (1-C) \cdot a \quad (23)$$

Correcting for these factors, the useful flux density of the composite structure in its working environment is $$B_a + 18,000 \, (1-C) + C(1-a) \cdot 1,800 - 18,000 \, (1-C) \cdot a = B_a + 1,800 \, (1-a)(10-9C) \quad (24)$$

This differs from the solid magnet by the increase $$1,800 \cdot 9 \cdot (1-a) \cdot (1-C) \quad (25)$$

This would indicate an unlimited improvement as $C$ becomes smaller. Of course the minimum limit to the value of $C$ is fixed by the limit to the density in the magnet material at which the coercive force begins to drop quite rapidly, which was assumed to be approximately 10,000 lines/cm.$^2$. This limit applies to the "in air" condition.

For a one-centimeter cube, the external flux in air is about 2,000 lines/cm.$^2$ and this is, of course, $B_a$. Putting the maximum flux density at 10,000 lines/cm.$^2$, $$\frac{B_a + 18,000(1-C)}{C} = 10,000 \quad (26)$$

and substituting 2,000 for $B_a$, $$C = 0.714 \quad (27)$$

The flux in the solid magnet is, when $a$ is taken as 0.1

$$2,000 + 1,620 = 3,620 \; \text{lines/cm.}^2 \quad (28)$$

The additional flux produced by the composite structure is $$1,800 \cdot 9 \cdot 09 \cdot 0.286 = 4,170 \; \text{lines/cm.}^2 \quad (29)$$

and the total flux is $$3,620 + 4,170 = 7,790 \; \text{lines/cm.}^2 \quad (30)$$

Thus the composite structure, having the same size and approximately the same weight as the solid magnet, has more than twice the actual flux capacity in spite of the fact that there is less actual magnet material.

The example, with its cubic shape and 10-to-1 ratio between air magnetomotive force and working magnetomotive force is fairly representative of many types of electrical devices using permanent magnets, and, therefore, although it is illustrated in this disclosure in connection with alternating current machines, it is applicable with the same beneficial results to other motor devices operated by permanent magnets, such as fields for dynamic loud speakers, and other electrodynamic devices such as holding or lifting magnets, etc.

A graphical analysis of the problem is helpful. In Fig. 11, line $B_sQ$ is the minor hysteresis loop for the magnet in the composite structure. Line PO represents the flux passing through the magnetic shunt. The ordinate of line PO decreases linearly with the M. M. F. across the shunt and is zero at the origin. The solid line $B_aQ$ is obtained by subtracting the ordinates of line PO from the ordinates of line $B_sQ$. It represents the external flux of the composite structure. If OH is the reluctance line for the working environment of the composite structure, the point M at intersection of $B_aQ$ and OH is the working point. $B_aQ$ is the total flux for somewhat more than a centimeter cross section of composite structure; in fact, it is the total flux for $1/C$ square centimeter. For comparison with this result, line $B_\omega T$ is the performance for a solid magnet of the same size as the magnet in the composite structure. It will be noted that this minor loop $B_\omega T$ is much lower than that for the composite structure B₃Q; so much lower that the necessary increase in cross section caused by adding the shunts does not seriously affect the improvement in overall performance.

If the iron is permitted to saturate, this diagram changes to Fig. 12. Here, PO is the saturation curve of the iron, and B₂Q is the new external flux curve. Point M is lower here than in Fig. 5 for a greater amount of leakage flux remains in the iron at M and is lost to the working circuit.

The advisability of avoiding more than a slight degree of saturation in the iron is plain from Fig. 12. The cross section of the magnetic shunt and its relation to the magnet material are interrelated by this fact. The flux path into the shunt should always, insofar as possible, be through air or material that has a linear relationship between flux and M. M. F. It is usually advisable to avoid contact between the magnet and shunt except at points of low M. M. F. An excellent structure, improving on the elementary structure of Fig. 10, is shown in Fig. 13. Here, the necessary air gap to limit the flux in the iron to its proper value is found in the wedge-shaped air gaps. At the same time, contact with the magnet is avoided except at the neutral point, and the iron shunts are lightened. No flux capacity of the iron is lost, however, for the same cross section remains at the point of maximum flux. In such structure, the composite magnet will be lighter as well as magnetically stronger than the solid magnet.

Another useful solution to the problem of limiting flux density and providing the proper air gaps is to employ a material having a high saturation flux, but a low permeability. A number of low permeability steels are known, such as manganese steels and chrome steels. Powdered iron or other powdered paramagnetic material may also be used, preferably of high density to retain a high saturation flux density. Such materials would not need any air gap if proper permeabilities were chosen by proper choice of alloy, or particle size and binder, if any, and a structure like Fig. 10 would be satisfactory. This may be tapered like Fig. 13, except that the air wedge may be on the outside, instead of between shunt and magnet. The tapering saves weight near the ends, where the flux is low.

If iron plates can be placed on the top and bottom of the magnet, they further improve the action by acting as collectors for the shunted flux, and provide a more uniform loading of the magnet throughout its volume. Structures incorporating this feature will be discussed later in this specification.

The magnetic shunt is also capable of protecting the magnet from the transient shock. Figs. 14 and 15 illustrate this action. The reluctance of the air gaps of the machine of Fig. 15 is G₁, and the total flux is φ₁. The reluctance of the rotor is G₃, the total flux φ₃, and the coercive force is C. The demagnetizing M. M. F. of the stator, assumed to be directly opposed to C, is F. If a magnetic shunt, assumed integral with the magnet in Fig. 15 is now provided between the pole faces N and S, with a proper limiting air gap, G₂ is the reluctance of this path and φ₂ is its flux. Solving for φ₃, $$\phi_3 = \frac{G_2(C-F) + CG_1}{G_1G_2 + G_1G_3 + G_2G_3} \quad (31)$$

It is noted that even if F is as great as C, φ₃ is still positive. In fact, φ₃ becomes zero only when $$F = C\left(1 + \frac{G_1}{G_2}\right)$$

The factor $$\frac{G_1}{G_2}$$

is the contribution to the protection of the magnet made by the shunt G₂. It is clear that a complete protection against transient shock can be worked out with the shunt alone, but this solution, although an improvement on the prior art, is not generally the best design available with full use of the methods of the invention, to be discussed in the next and succeeding sections. Nevertheless, such structures are illustrated in Figs. 16 and 17, and their description is given below.

*Rotors with magnetic shunts only*

Fig. 16 represents a construction making use of the principles of the magnetic shunt, the effect of which is, as stated in the "Magnetic Shunt" section, to increase the efficiency of the magnet in the rotor, and in addition to protect this magnet from stator currents, particularly short-circuit currents.

In Fig. 16, the permanent magnet is illustrated at 1600, and its skewed pole pieces appear at 1602 and 1604. These pole pieces may comprise a unitary structure with the permanent magnet identical to the structure illustrated in Fig. 3; however, a preferred construction is that disclosed in connection with the Figs. 5 to 8, where the salient pole pieces are made of soft iron, and are provided with damping windings. The magnetic shunt comprises two curved plates 1606, 1608, made of magnetic material, which are fastened to the salient pole pieces 1602 and 1604 in any convenient manner. To control the shunting effect of the magnetic shunt and to impart to the entire structure mechanical unity, arcuate segmented spacers 1610, 1612, 1614, and 1616 of nonmagnetic material are provided, thus fixing the dimensions of the air gap.

In putting this invention into practical operation, it must be remembered that the magnetic shunts now form an additional path for armature reaction during normal load conditions, and this, if uncorrected, will increase the effective synchronous impedance of the machine, particularly when wound single phase. This effect can be reduced, for the single-phase application, by providing an effective damper for the iron shunts themselves, which will reduce this unwanted action of the magnetic shunts. Such structure is illustrated in Fig. 28, the description of which appears later in this specification. Since the effect of the armature reaction on the magnetic shunts during ordinary load conditions is relatively small as compared to that during the short-circuit condition, the cross section of such a damper may be far smaller than the cross section of the copper loop protecting the magnet itself.

Another way of obtaining this damper action in the magnetic shunts is illustrated in Fig. 16. For example, in Fig. 16, the material acting as nonmagnetic spacers 1610, 1612, 1614, 1616 between the pole pieces 1602, 1604, and the magnetic shunts 1606, 1608, whereby the air gap and the reluctance of the magnetic shunts are controlled, may also act to produce this desired damper action, if it is made of highly conductive material, such as copper or aluminum.

Because the iron in the shunts has a definite saturation value, these shunts, if designed for optimum magnet efficiency, are relatively ineffective in protecting the magnet material against the short-circuit transients previously described. The iron of the shunts would quickly saturate long before it passed sufficient flux to satisfy the Lenz's law requirements of the reaction in the short-circuited armature turns. It is, of course, possible to supply sufficient iron in these shunts to handle the full magnetic flux of the transients, but such a design is impractical because of the large masses of iron required. Therefore, the magnetic shunts are proportioned so as to prevent unduly large loss of induction in the permanent magnet during its excursion from the magnetizer to the machine, and when it is removed from the machine. Thus, it is seen that while the shunt method is peculiarly effective in preventing demagnetization of the type encountered when the rotor is removed from the machine of the magnetic circuit, and is relatively ineffective against the short circuit transients, the permanent magnet copper loop is peculiarly effective against short circuit transients. Since the removal of the rotor from the machine normally has a delay of minutes or longer, the copper loop is entirely ineffective in protecting the magnet against removal from the low reluctance path of the machine.

Figure 17 shows a form of structure of Fig. 16 in which the magnetic shunts 1704, 1705 are normally held away from soft iron pole pieces 1701, 1702 by springs 1707, 1708, 1709 and 1710 producing air gaps 1711, 1712, 1713, and 1714 in addition to the minimum gaps provided by nonmagnetic spacers 1715, 1716, 1717 and 1718. In the normal condition, i. e. when the rotor is in the machine, the magnetic potential produced by magnet 1700 between pole pieces 1701 and 1702 is low, because of the low reluctance flux path provided by the stator, not shown. When the stator produces large demagnetizing forces, this magnetic potential rises greatly, and shunts 1704 and 1705 are more strongly attracted to pole pieces 1701 and 1702, closing air gaps 1711, 1712, 1713 and 1714 and providing a more effective shunting path for the flux of the magnet 1700, thus reducing the demagnetization of magnet 1700 arising from the armature reaction. When the structure of Fig. 17 is removed from the stator, the magnetic potential between pole faces 1701 and 1702 also rises greatly, and shunts 1704 and 1705 again close the air gaps 1711, 1712, 1713 and 1714 as previously described with similar beneficial results.

Springs 1707, 1708, 1709 and 1710 and spacers 1715, 1716, 1717 and 1718 are so chosen that when normal operating conditions are restored, and the stator again presents a low reluctance path for the flux, the shunts 1704 and 1705 will not be held strongly enough by magnetic attraction to remain pressed against pole pieces 1701 and 1702, and will return to their original positions against stops 1719, 1720, 1721 and 1722. Thus, the amount of flux shunted under normal operating conditions is reduced.

Fig. 17 illustrates that type of construction in which the nonmagnetic shaft pierces the permanent magnet. Obviously enough this lowers the efficiency of the rotor structure, and a more effective structure is the one where the rotor shaft is fastened to the magnetic shunt rather than being mounted in the permanent magnet. This is illustrated in Figs. 16 and 20 through 32 the latter figures illustrating the rotors equipped with the magnetic shunt as well as the magnet-protecting loop. The theoretical analysis as well as the description of several examples of such composite structures is given below.

*Composite structures consisting of magnetic shunt and conducting loop*

*Theoretical analysis of the composite structures.*—In discussing the theory of behavior of the magnetic shunt structures, it has been stated that a complete protection against transient shock can be worked out with the shunt alone; but it was also stated that such solution would usually be quite bulky, and, further, that it would be at variance with the best design for the magnetic efficiency of the composite structure.

Preferably, then, the shunt is designed for best magnetic efficiency, and the added resistance to transient shock is used in reducing the amount of material in the conducting loop. Here is a case of unique cooperation of the magnetic shunt and the short circuit loop, which assist mutually and at the same time accomplish different individual purposes without creating any mutual interference.

It will be noted more clearly from the description of the specific structures that is to follow that four general classes of structures of magnetic shunt and short circuit loops are available.

In the first, the conducting loop rings both the magnet and the shunt; i. e. the loop rings the composite structure. Figs. 18 through 23 are examples of the first class of structures.

In the second class, the conducting loop rings the magnetic material, but not the shunt, which is put on the outside of the loop. Figs. 24 through 27 and 33 through 35 are examples of such a design.

Figs. 28 and 29 illustrate the third class of structures in which the main conducting loop surrounds the permanent magnet only, the magnetic shunt adjoins the main loop, and there is an auxiliary conducting loop surrounding the entire rotor.

In the fourth type of structure, there are two magnetic shunts, one next to the permanent magnet, and the other next to the conducting loop, the loop being placed between the two shunts. Figs. 30, 31, and 32 illustrate the fourth type of structure.

Classes 3 and 4 are thus partly effective as class 1, and partly as class 2. Further subdivision of the conducting loops and shunts may be advisable in special cases, for example, that shown in Fig. 32. It is understood that these variations of form are different ways of compromising mechanical and structural problems with the electrical and magnetic factors. The structural features of these combinations are described in the succeeding section of this specification.

The second class of structure shows the unique cooperation of the magnetic shunt and the conducting loop, as already discussed. The first class of structure shows an even better cooperation of these elements. The performaince of these two types of structure will now be analyzed, with reference to Fig. 9. The Equation 7, $$\frac{\Delta \phi_1}{R_1} - \frac{\Delta \phi_2}{R_2} = 0$$

for the conducting loop will be recalled, with $\Delta\phi_1$ being the flux change in the stator, $\Delta\phi_2$ the flux change in the rotor, and $R_1$ and $R_2$ being the effective resistances of the stator winding and of the magnet loop, respectively.

If the loop is applied to a solid magnet, working for example on minor hysteresis loop $m-d$ of Fig. 9, the flux in the magnet may change from $B_d$ to $B_m$ without leaving the minor loop in question. Here, $0-f$ is the reluctance line for the machine magnetic circuit. If the flux drops below $B_m$, due to some demagnetizing force, the magnet state will shift approximately along the major loop $B_r-f-m$ from $m$ to the region of point "$a$" and the lower minor loop $a-c$ will thereafter determine the magnet condition. This of course corresponds to a permanent loss of flux and voltage in the generator. The maximum harmless change in flux is therefore $B_d-B_m$.

Now, the flux in the stator, at the moment of short-circuit condition, was also $B_d$, and after the 180° rotation, in the mathematical derivation given by Equation 7, it becomes $-B_d$. Hence, the flux in the stator must change from $-B_d$ to $+B_m$, or increase by amount $B_d+B_m$ and the flux in the rotor decreases by amount $B_d-B_m$. Thus $$\Delta\phi_1 = B_m - (-B_d) = B_m + B_d$$

$$\Delta\phi_2 = -(B_d - B_m)$$

or $$\frac{R_2}{R_1} = \frac{B_d - B_m}{B_d + B_m} \quad (32)$$

(for solid magnet).

If the loop is applied directly to the permanent magnet and the magnetic shunt is put outside of the loop, as in Fig. 24, the shunt supplies a path by-passing an amount of flux, say $B_u$, during the transient state. The flux of the stator that must be changed during the transient state to avoid demagnetization is then reduced by this amount. Hence, $$\frac{R_2}{R_1} = \frac{B_d - B_m}{B_d + B_m - B_u} \quad (33)$$

(conducting loop surrounds permanent magnet only). (Class 2.)

If the conducting loop is applied outside the shunt, the flux change in the composite magnet may be increased by the same amount as the flux that is by-passed by the shunt during the "in air" condition. This amount is not far from saturation for the shunt iron, and is not far from, though less, than $B_u$, above.
Hence $$\frac{R_2}{R_1} = \frac{B_d + B_u - B_m}{B_d + B_m - B_u} \quad (34)$$

(conducting loop surrounds magnetic shunt and permanent magnet). (Class 1.)

The latter ratio, (34), is obviously more advantageous theoretically than the former (33), but some purely mechanical factors favor the structures which are built in accordance with Equation 33. By placing the copper loop directly against the magnet, rather than around the combined structure of the magnet and the magnetic shunt, the copper loop is made shorter, and it also acts as a spacer between the magnet and the shunt, thus utilizing the space which is wasted in the structures of the other type. These advantages partly compensate for the differences between Equations 33 and 34, and since the structure is simpler, the cost factor favors Class 2 structure.

The relationship expressed by Equations 33 and 34 is also clearly illustrated in a graphic form in Fig. 11. The composite magnet works on line $B_aM$, and will not be injured unless the flux in the composite structure drops below $B_a$. Hence, the safe flux change in the structure is $M-B_a$, and in the stator, $M+B_a$. The much larger value of the ratio $$\frac{M-B_a}{M+B_a}$$

as compared to $$\frac{M'-B_s}{M'+B_s}$$

is evident.

It should be equally evident that the much larger safe flux changes in the rotor when it is provided with the composite magnet structure results in a progressive saving in the necessary conducting loop cross-section to supply a low enough $R_2$.

Equations 32 and 33 are based on the fundamental Equation 7 for the action of the conducting loop. In column 29 of the specification, the reasons for the approximate nature of the latter are given, and it is stated that for practical design purposes the results given by Equation 7 should be multiplied by a factor less than unity, depending on the specific structural design. The same is true of the Equations 32 and 33, since they are based on Equation 7.

*Description of the composite structures*

The composite rotor structures are illustrated in the Figs. 18 through 35. The rotors in the Figs. 18 through 32 are for a single phase machine while the rotors in Figs. 33 through 35 are for a polyphase machine.

Proceeding now with the description of the Figs. 18 and 19, Fig. 18 is an exploded oblique view of the rotor, and Fig. 19 is its cross sectional view along line A—A of Fig. 18. The same numerals identify the same elements in the figures. It may be recalled from the previously given classification of the composite structures that Figs. 18 and 19 belong to the first class of structures in which the conducting loop rings both the magnet and the shunt, i. e., the loop is the external element in the structure. A permanent magnet 1800 has a cylindrical shape with a non-magnetic shaft 1802 centrally mounted within the magnet. The magnetic shunt consists of two doughnut-shaped discs 1804 and 1806 which slidingly fit shaft 1802. Nonmagnetic spacers 1807 and 1808 are interposed between the magnetic shunts and the permanent magnet. The purpose of the spacers 1807 and 1808 is to prevent too much flux flow from the ends of the permanent magnet 1800 into the sides of the iron discs 1804 and 1806. Although such flux flow is partially effective in obtaining the desired shunt action, the only completely effective flux flow from the point of view of shunting effect is that flowing from the pole pieces 1814 and 1816 into the magnetic shunt. The magnet protecting conducting loop consists of two skewed frames 1810 and 1812, the dimensions of which have been enlarged as compared to the dimensions of a similar loop illustrated in Figs. 5 through 7 to encircle the permanent magnet 1800 as well as the magnetic shunt discs 1804 and 1806. This is illustrated more clearly in Fig. 19 where the conducting loop appears as two external side walls of the structure. Soft iron pole pieces 1814 and 1816 equipped with the damper windings 1817 fit into the recesses provided for this purpose in the conducting loops, and the entire structure is held together by means of metal bands 1818 and 1820. These bands are shrunk or forced onto the grooves provided for this purpose at the outer ends of the soft iron pole pieces and the conducting loop pieces. As in the case of Fig. 5, the bands 1818 and 1820 should have sufficient initial tension to hold the soft iron pole pieces 1814 and 1816 in intimate contact with the magnet at the highest speed at which the rotor may be turned. The bands are preferably made of non-magnetic or slightly magnetic material, such as stainless steel, but magentic material may be used without great loss in performance because of the small cross section of the bands. Rings 1822 and 1824 are made of nonmagnetic material and are used as spacers between the magnetic shunts and the soft iron pole pieces 1814 and 1816. The relationship of these spacers with respect to the soft iron pole pieces and the magnetic shunts is clearly illustrated in Fig. 19. The spacers 1822 and 1824 may be omitted altogether since the magnetic shunts 1804 and 1806 are held in their proper relationship with respect to the pole pieces by shaft 1802 which forms a sliding fit with the holes provided in the magnetic shunts. Whether the spacer rings 1822 and 1824 are used or not, the outside diameter of the magnetic shunt discs 1804 and 1806 should always be smaller than the outside diameter of the permanent magnet cylinder 1800 so that a nonmagnetic gap exists between the soft iron pole pieces 1814, 1816 and the discs 1804 and 1806.

From the examination of Fig. 19, one may readily see that the iron shunt path has been placed within the loop 1810 and 1812 which now acts upon the sum of the fluxes through the magnet and the magnetic shunt, and, therefore, this embodiment belongs to the first class of combinations previously discussed.

Figs. 20 through 23 illustrate another form of rotor with the magnet protecting loop surrounding the entire structure just as it does in Figs. 18 and 19; accordingly, it is also a Class 1 structure, and may be considered as a modification of Fig. 18.

In the figures, 20 is an exploded oblique view of the rotor, 21 is a side view, 22 is an end view, and 23 is a cross sectional view of the rotor taken along the line A—A shown in Fig. 20. The conducting loop in this modification consists of two side pieces 2002 and 2004, and two doughnut shaped discs 2006 and 2008. The magnetic shunt consists of two end plates 2010 and 2012, and the permanent magnet now consists of a solid cylindrical piece 2000. Two shaft pieces 2014 and 2016 are now mounted in the magnetic shunts avoiding the disadvantage of having the shaft extend through the magnet as has been previously noted in connection with the description of Fig. 8. The principal differences between Fig. 18 and Fig. 20 are mechanical, the electrical and magnetic relations remaining identical to those previously discussed; except that more flux is now obtained because of the added magnetic material resulting from making the permanent magnet of solid construction. The soft iron pole pieces are of the same shape as the soft iron pole pieces in Fig. 18, and are provided with damper windings 2019 and 2021 as in the preceding examples. The nonmagnetic spacers 2022, 2024, 2026 and 2028 match the corresponding grooves in the soft iron pole pieces, and are used for interposing a nonmagnetic gap between the permanent magnet and the magnetic shunt plates 2010 and 2012. In this modification, they are made of copper or other good conductor and, besides serving as the nonmagnetic spacers, they are also used as the end conductors interconnecting the damper bars. The relationship of the nonmagnetic spacers with respect to the magnetic shunts and the pole pieces is clearly illustrated in Fig. 23. The interposed gap is such as to produce substantial saturation, but no more, in the shunts 2010, 2012, when the rotor is removed from the stator; the reasons for such proportioning of the gap were given previously in connection with the description of Fig. 12. The inner surfaces of the soft iron pole pieces are slightly countersunk thus forming two side shoulders 2030 and 2032 in the soft iron pole piece 2020, and the corresponding side shoulders in the other pole piece 2018; the shoulders hold the permanent magnet in a fixed relationship with respect to the magnetic shunts. The same result may be accomplished by using spacers between the permanent magnet and the magnetic shunts. The entire assembly is held together either by spot welding or brazing the copper pieces 2002 and 2004 to the copper discs 2006 and 2008. The brazed joints are illustrated in Fig. 22 by the heavy lines 2034 and 2036. This welding operation is performed after shrinking the magnetic shunts 2010 and 1012 over the spacers and the soft iron pole pieces.

Figs. 24, 25, 26 and 27 illustrate a structure of the second class in which conducting loops 2402 and 2404 surround the permanent magnet cylinder 2400, and the magnetic shunts 2406 and 2408 are mounted outside of the conducting loop. The relationship of the elements with respect to each other in this type of structure may be seen readily by examining the cross sectional view illustrated in Fig. 27, taken along line A—A, Fig. 24. The cylindrical magnet 2400 represents the central piece of the structure which is surrounded by the conducting loop pieces 2402 and 2404, with the soft iron pole pieces 2410 and 2412 fitting into the proper recesses in the conducting loop pieces. Nonmagnetic spacers 2414, 2416, 2418 and 2420 are used in the same manner and for the same purpose as in the preceding figures. From the examination of Fig. 27 one may see that this type of construction results in a compact structure, since the side spacer between the permanent magnet and the magnetic shunts also acts as the end conductor for the damper bars, to which it is soldered, welded or brazed.

In Figs. 28 and 29 another modification of Figs. 24 through 27 is illustrated. Only a conductive loop piece 2804 and one magnetic shunt plate 2806 are illustrated in these figures, which correspond to the conducting loop 2404 and the magnetic shunt plate 2406 in the Figs. 24 through 27. The modification resides in the fact that the magnetic shunt itself is now surrounded by two auxiliary conducting loops 2808 and 2810; the other half of the loops is broken away in Fig. 28, which, if they were shown in the Figs. 24 through 27, would surround the entire structure by surrounding the magnetic shunt pieces 2406 and 2408. The main conducting loop 2804 is provided with two grooves 2812 and 2814, for embedding the lower loop 2810 of Fig. 28. Similar grooves are provided in the other half of the main conducting loop (not shown) for accommodating the upper loop 2808. As in the case of Fig. 24, the magnetic shunt acts as mechanical terminations for shaft 2816. The auxiliary loops resist any flux fluctuations in the combination of magnet and shunt, i. e., of the composite structure. The arrangement may be thought of as having partly a Class 1 and partly a Class 2 action. This particular combination has been defined as Class 3. The construction illustrated in Figs. 28 and 29 thus retains most of the advantages of the combination illustrated in Fig. 24 and incorporates an additional feature which resists the flux fluctuations in the magnetic shunt.

It should be added here parenthetically that although Figs. 24 through 29 all illustrate the rotor shaft mounted on the magnetic shunts, the type of shaft mounting illustrated in Fig. 18 may also be used.

Figs. 30 and 31 illustrate the third class of structures which have two magnetic shunts with the conducting loop placed between the shunts. Fig. 30 illustrates a side elevational view with the upper left corner of the rotor broken away and shown as a cross section. Fig. 31 shows a vertical cross-sectional view of the rotor taken along line A—A of Fig. 30. Here the permanent magnet is again of cylindrical form, and the external magnetic shunt pieces 3002 and 3004 act as mechanical terminations for shaft 3006 and 3008 so that the permanent magnet is solid throughout. The inner magnetic shunt pieces 3010 and 3012 are held in fixed relationship with respect to the permanent magnet by means of nonmagnetic spacers, one of which is illustrated at 3014 in Fig. 30. The conducting loop consisting of two box-type frames 3016 and 3018 which surround the permanent magnet and the inner magnetic shunt. The soft iron pole pieces 3020 and 3022 fit into the recesses provided in the conducting loops, and the outer magnetic shunts form two end plates which are shrunk over the outer projecting ends of the pole pieces. Nonmagnetic spacers 3024 and 3026 are used again, as in the preceding examples. The skewed bars 3017 and 3019 of the conducting loops do not fill in the entire space between the soft iron pole pieces, which results in recesses 3028 and 3030, Fig. 31. These are utilized for mounting two bolts 3032 and 3034 for laterally bracing the entire rotor structure. The bracing bolts may also be mounted parallel to the axis of the rotor.

The structure of Figs. 30 and 31 may be thought of as one which operates partly as Class 1 and partly as Class 2 structure. In the embodiment of Fig. 28 there were two conducting loops, here there are two shunts. Since Class 1 is superior to Class 2, the outside shunts 3002 and 3004 are made heavy enough only to supply the necessary mechanical strength. This structure retains some of the mechanical simplicity of the outside shunt construction, together with most of the effects of Class 1 operation. This particular combination has been defined as Class 4.

Fig. 32 illustrates an application of the magnetic shunt principle to a long rotor of small diameter which has reasonable magnetic efficiency in spite of its small diameter. As in the case of Figs. 30 and 31, the magnet protecting loop in Fig. 32 surrounds the inner magnetic shunts, 3210, 3212 and 3214. Two external magnetic shunts 3224 and 3226 form two side plates of the rotor which also act as mechanical terminations for shaft 3220 and 3222. Thus, the structure in Fig. 32 may be termed as Class 4 structure which utilizes an inner and outer magnetic shunt with the conducting loop placed between the two shunts. The principal difference resides in the fact that the permanent magnet and the inner shunt are now composed of a plurality of parallel elements, the magnet comprising cylindrical pieces 3202, 3204, 3206 and 3208, with the inner magnetic shunt pieces 3210, 3212 and 3214 being interposed between the permanent magnets. The conducting loop, consisting of two pieces 3216 and 3218, is identical in its form to the conducting loops 2402 and 2404 of Figs. 24 through 27, except that in the case of Fig. 32 it is obviously much longer. The remaining structural features of Fig. 32 are otherwise similar to the features that have been already described in connection with the preceding figures. The outer magnetic shunt pieces 3224 and 3226 are shrunk onto the soft iron pole pieces 3228 and 3230 and spacers 3232. The inner magnetic shunts 3210 through 3214 are also provided with the nonmagnetic spacers 3234 so that the nonmagnetic gaps between the pole pieces and the shunts are the main elements limiting the reluctance of the rotor when it is removed from the machine. The inner magnetic shunts are tapered for avoiding too close proximity to the magnet material except in its neutral regions. Nonmagnetic setscrews 3236 may be used for mechanically bracing the pole pieces, thus increasing the strength and rigidity of the structure. The rigidity of the structure may be increased still further by providing bracing bolts similar to the bolts 3034 and 3032 of Figs. 30 and 31. If this modification is incorporated in the rotor illustrated in Fig. 32, the shape of the conducting loop should be similar to that illustrated in the Figs. 30 and 31. The advantage of the multiple cell structure resides in the fact that it reduces the thickness of the soft iron pole pieces 3228 and 3230, while permitting them to supply the flux necessary for obtaining good magnet efficiency to the shunts without danger of saturation when the rotor is removed from the low reluctance circuit of the machine. The thickness of the pole piece is obviously inversely proportional to the number of parallel flux paths provided by the shunts. It should also be mentioned that it may be found more economical to have the inner magnetic shunts in the form of flat discs rather than tapered. When this is the case, nonmagnetic spacers similar to the spacers illustrated in Fig. 30 or 18 may be used for fixing the dimensions of the nonmagnetic gaps.

In all the modifications shown in any of the figures of the drawing, the use of shunts made of low permeability materials having nevertheless a high saturation flux, such as manganese steel or iron powder, may be used to eliminate the need of spacers, as explained previously. A specific permeability would, however, be required for each design.

Fig. 33 illustrates the adaption of the design principles to a multipole machine. Two disc-shaped members 3302 and 3304 made of any light-weight material such as aluminum, are fastened in a suitable manner to a shaft 3300. An annular member 3306, having polygonal outer surfaces 3307 and made of ferro-magnetic material, is mounted in recesses 3308 and 3310 of the discs 3302 and 3304. The number of sides in the polygonal member 3306 corresponds to the number of poles and the number of permanent magnets 3312 used in the rotor. The permanent magnets are shown as rectangular parallelepipeds since the use of such form results in an effective utilization of the available space. It may be desirable to taper the magnets, with the heaviest section nearest the shaft, since this end carries the interpole leakage, and so carries a greater amount of total flux than the upper end. It is obvious, however, that the magnets may have any other form if so desired. The polygon faces 3307, and the ends of the magnets resting upon them, should preferably have good surface finish so that the reluctance of this contact joint is low. Firm contact is maintained between the discs 3302, 3304, member 3306, and the permanent magnets 3312 by means of bolts 3316, joining the discs 3302, 3304, and by means of steel bands 3330 and 3331 shrunk over the pole-pieces 3325. In small generators, the design usually calls for a maximum length and circumferential width of magnet, and in this case the magnet cross section should be equal to the areas of the polygon faces so that the edges of the permanent magnets meet, as shown at 3314. This factor determines the optimum outer dimensions of the polygon, while its thickness is governed by the permeability of its material, since flux flowing from one magnet to the adjacent magnets should not produce any saturation in this portion of the magnetic circuit.

The magnet-protecting conducting loop may be a closed ring (not shown) slipped over the magnet 3312, or it may consist of a single high conductivity member 3318, with broached holes for accommodating the magnets, leaving sufficient material for side walls 3320 and interpole members 3322 to form the desired loop. This latter structure may also be built up of bars between the poles and rings which fit against the ends of the bars with a soft or hard solder or weld joining them for completing the mechanical structure and the electrical circuit of the loops. The loop is provided with the outwardly projecting ribs 3324 forming the interpole spacers for properly spacing the soft iron pole pieces 3325, which are slipped into the recesses formed by the interpole spacers 3324. The bases 3328 of the soft iron pole pieces 3325 are provided with flat bottoms matching the flat tops of the magnets 3312 and are made wider than the effective field pole piece 3325. This construction provides a suitable air gap between adjacent pole piece bases, and these bases act as magnetic shunts thus keeping the magnet material at high efficiency when the rotor is withdrawn from the magnetizer or the stator. The effective pole piece 3325 may, of course, be made as wide as the base 3328 if design permits. The damper winding is illustrated at 3326. It consists of a sheet of copper electroplated on top of the soft iron pole pieces 3325. The copper 3326 may be in the form of a sheet attached to the pole pieces by soldering, spot welding or other suitable means.

The multipole rotor illustrated in Fig. 33 may be successfully used in connection with an alternator having any axial length since any increase in the length of the rotor results in the corresponding increase in the length of the permanent magnets, the length of the soft iron pole pieces, and, as a consequence, in the corresponding lengthening of the magnetic shunts. Accordingly in Fig. 33 the magnetic shunts do not become saturated, as differentiated from Fig. 32, when the rotor is lengthened.

Figures 34 and 35 illustrate another adaption of the design principles to a multipole machine. Figure 34 is the cross-sectional view of the rotor taken along line A—A shown in Fig. 35, and Fig. 35 is the oblique view of the rotor illustrated in Fig. 34 with some of the members cut away for clearer illustration of the structure. A six pole rotor is used for exemplifying the structure. In some respects the rotor illustrated in the Figs. 34 and 35 is similar to the rotor illustrated in Fig. 33. The most important modifications reside in the lengthening of the permanent magnets and positioning the magnetic shunts along side of the copper loop. The permanent magnets 3400 have been extended beyond the point 3401 where the lateral planes of the magnet intersect each other. This has been accomplished by cutting off the lower corners of the magnets with the result that the outer diameter of the hexagonal hub member 3402, which corresponds to the polygonal member 3306 in Fig. 33, has been considerably reduced allowing complete elimination of the side members 3302 and 3304 used in Fig. 33. One end of the hub member 3402 is threaded, and the other end is provided with a flange 3403 so that the entire member, together with a nut 3415, forms a bolt which holds the permanent magnets 3400 in fixed positions. The bolt is provided with a hole which is used for mounting a shaft 3404 of the rotor. The copper loops are formed rings 3405 and 3406 which are soldered to the cross members 3507. The soft iron pole pieces 3408 are held tightly against the flat faces of the permanent magnets by means of setscrews 3409 which connect the pole pieces to rings 3410 and 3411, as illustrated more clearly in Fig. 34. The rings 3410 and 3411 are made of magnetic material and comprise the magnetic shunts in this type of rotor. The magnetic shunt rings are mounted directly on the copper loop rings 3405 and 3406 by means of setscrews 3512, one of which is shown in Fig. 35. The magnetic shunt circuit of the permanent magnets is, therefore, as follows: the upper face of the magnets, the pole pieces 3408, air gap between the pole pieces and the magnetic shunt rings 3410 and 3411, magnetic shunt rings, the air gap between the magnetic rings and the pole pieces, and the upper face of the magnet having the opposite polarity to the polarity of the adjacent magnet. As illustrated more clearly in Fig. 34, there is a small air gap between the inner surfaces of the pole pieces and the outer rim of the copper rings. This type of dimensioning of the copper rings enables one to hold the pole pieces tightly against the flat surfaces of the magnets. The damper winding 3414 consists of a continuous ring of copper shrunk over the pole pieces.

The advantages of the structure illustrated in Figs. 34 and 35 are larger total flux because of the increased length of the permanent magnets, simplified structure of the central polygonal member 3402 and of the copper loop, the latter now consisting of two copper rings and rectangular members 3507. The same simplification of shapes has been extended to the shape of the pole pieces and the magnetic shunts.

Fig. 38 discloses one method of magnetizing the rotors when they are provided with the magnetic shunts. The magnetizer consists of a coil 3800 with its outer terminals 3802 and 3804 connected to a source of either direct or alternating current. An appropriate circuit breaker disconnects the coil shortly after its circuit has been connected to the power source. The coil 3800 is mounted on a magnetic plate 3806 and is surrounded by a strong steel cylinder 3808, the latter supporting a magnetic cover 3810. Upon proper orientation of the rotor structure within the magnetizer coil 3800, which completely surrounds the rotor, the magnetizer is closed by means of the magnetic cover 3810 and the magnetizing coil is connected to the source of power which is capable of producing full degree of magnetization in the permanent magnet material of the rotor. Upon magnetization the rotor may be removed from the magnetizer, and, because of the presence of the magnetic shunts which provide relatively low reluctance path during this transfer of the rotor from the magnetizer to the stator, the permanent magnet suffers only a relatively low degree of demagnetization during this transfer interval. As described previously in connection with the Figs. 9 through 15, the use of the magnetic shunt enables one to operate the rotor on a much more favorable minor hysteresis loop, such as loop $m$—$d$ shown in Fig. 9.

In Fig. 39 the same magnetizer is used for magnetizing a rotor of the type illustrated in Figs. 5 through 8 which is provided with the magnet-protecting loop, but does not have any magnetic shunt. When this type of rotor is used, it is necessary to magnetize it when it is placed in the low reluctance circuit of its stator. This method works on the major hysteresis loop for example, in Fig. 9, the magnet goes to $B_s$ when the magnetizing current flows, and moves immediately through $B_r$ to $f$, its working state, when the magnetizing current is shut off. By the use of a sufficiently high conductivity magnet-protecting loop, the magnet could be made to suffer little or no permanent shift from the state $f$ under short circuit transients, but is not protected as well against the steady state currents of heavy low power loads or the steady state short circuit currents, the latter usually being the most destructive. These demagnetizing currents will move the magnet state from $f$ to $u$, Fig. 9, and the magnet will henceforth operate on the minor loop $u$—$g$. Steady state currents, even at short circuit, are not usually as strongly demagnetizing as the result of removing the rotor from the stator, as was done in the machines previously described, hence no loss has previously been noted from this cause. However, the very high state $f$ of Fig. 9 will be reduced by even the slightest demagnetizing force, moving down and toward the left along the main hysteresis loop $B_r$, $f$ to $u$. This is still a very high state of magnetization, in general, much higher than such a point as $m$ previously obtained with rotors removable from the stator, and in this lies its advantage.

Since the steady state demagnetizing effects of such type cannot be prevented by the magnet-protecting loop, the protection that is given by the loop against demagnetization due to transients should be proportioned so that the two types of demagnetization phenomena produce approximately equal degrees of demagnetization. In other words, the demagnetization due to transients in an ideal case should not extend beyond the "$u$" point on the minor hysteresis loop $g$—$u$. This, in fact, illustrates the general principle in the design of the conducting loop; that protection of the magnet against transients need be no better than the protection available from other causes of demagnetization. It may sometimes be advisable to permit a moderate loss due to transients if the design saving in the conducting loop warrants it; more usually, however, it is better to make the loop heavy enough or even slightly heavier than is required to protect to the same level as that produced by the other demagnetizing actions present.

An additional magnetizing procedure which may be used in connection with the two-pole rotors is that illustrated in Fig. 38 plus an additional magnetization after placing the rotors in their operating position in the stators. By passing very large current through the working windings of the stators, the additional remagnetizing impetus may be imparted to the magnet material by the flux generated by the stator windings thus raising the degree of magnetization to a higher level. This machine also suffers from the disadvantage of permanent loss of voltage if the rotor is removed from the stator.

In choosing a material for the conducting loops of the invention, it should be remembered that if space is at a premium, copper is the commercial metal with the best conductivity per unit of volume. However, if space is not a major factor, aluminum, which has 65% of the volume conductivity, but over 200% of the weight conductivity of copper, may be a better material. Magnesium is only slightly different from aluminum in weight conductivity.

Another reason for preferring aluminum in some cases lies in the fact that high conductivity copper is hard to cast, because of the great tendency of molten copper to absorb carbon monoxide, which, escaping as the copper solidifies, renders the casting spongy and usually well below 70% of the normal conductivity of pure copper. Aluminum may be cast readily, and further, its conductivity is not very sensitive to impurities, as much as 1.6% of impurity causing only a 20% drop in conductivity.

In conclusion it may be stated that the alternating current machines described in this specification possess many electrical and mechanical advantages which should be apparent to those skilled in the art. A permanent magnet field structure is provided for the alternating current machine and this field is now protected against the most severe type of demagnetization encountered under running conditions, which is demagnetization produced by transients due to sudden application of loads or short circuits, while in the prior art such demagnetization was partly reduced by lengthening the magnets far beyond the point where performance began to suffer, and partly was tolerated as a stabilization loss of magnet flux, which usually halved the performance still remaining. The present invention provides a magnet protecting loop, the dimensions of which may be such that even a full short circuit will have no permanent effect on the magnets of the field.

A magnetic shunt has been provided for a permanent magnet field which resists that demagnetizing effect which takes place when the permanent magnet is removed from the magnetic circuit of the magnttizer, or of the alternating current machine whenever removal becomes necessary for repairing the machine. The prevention of such types of demagnetization enables one to operate the permanent magnet material at a higher degree of magnetization which results in a machine having higher efficiency for pound weight of permanent magnet material used.

Esptcially advantageous combinations of the conducting loop and the magnetic shunt, taking several forms, have also been disclosed.

The above advantages have been achieved by providing very stable and simple mechanical structures which produce an alternating current machine possessing high degrees of electrical and mechanical stabilities. One of the mechanical refinements disclosed in this specification involves a split shaft for the rotor, the inner ends of this shaft being mounted in the magnetic shunt, or in the conducting loop, or both, which results in a permanent magnet rotor with a higher energy content per cubic displacement of the rotor.

It is believed that the construction and operation of the disclosed alternating current machines as well as the many advantages thereof will be apparent from the foregoing description. It should be understood, nevertheless, that while I have shown and described my invention in several preferred forms, many changes and modifications may be made without departing from the spirit of the invention as sought to be defined in the following claims.

I claim:

1. An alternating current machine comprising a stator, distributed polyphase stator windings, a permanent magnet rotor having its flux linked with said stator windings, and a magnet protecting loop surrounding said rotor, said loop having a resistance R which is at most equal to $R_s/n^2$, where $R_s$ is the resistance of one phase of said stator windings, and $n$ is that number of turns said one phase of stator windings would need to have the same number of flux linkages with the permanent magnet rotor as the entire distributed stator windings have when said rotor is in a position making the total number of flux linkages a maximum.

2. An alternating current machine in accordance with claim 1, wherein said rotor comprises a plurality of permanent magnets which have been fully magnetized with said rotor placed in said stator during the magnetization process of said rotor.

3. An alternating current machine in accordance with claim 1, wherein said rotor includes a magnetic shunt, said magnetic shunt preserving the demagnetization of the permanent magnet material of said field during its transfer from a magnetizer into an operating position of said field in the machine.

4. A multipole permanent magnet rotor for an alternating current machine including a shaft, a polygonal member made of ferro-magnetic material connected to said shaft, a plurality of permanent magnets mounted on said polygonal member whereby said member magnetically interconnects the inner ends of said magnets, and a high conductivity magnet-protecting loop surrounding each of said magnets for preventing demagnetization of said magnets during electrically adverse operating conditions of said rotor.

5. A multipole permanent magnet rotor as defined in claim 4 in which said magnets comprise radially mounted hexahedrons, the area of the base of each hexahedron being substantially equal to the area of the matching face of said polygonal member.

6. A multipole permanent magnet rotor as defined in claim 4 in which said magnets comprise radially mounted hexahedrons, and said magnet-protecting loop comprises two side-rings and a plurality of prismatic members interconnecting said side-rings, said prismatic members and said side-rings forming rectangular openings for said hexahedrons.

7. A multipole permanent magnet rotor as defined in claim 4 which further includes two side discs for rigidly attaching said shaft to said polygonal member.

8. A multipole permanent magnet rotor as defined in claim 4 which further includes ferro-magnetic salient pole pieces mounted over the outer pole-faces of said magnets, said pole pieces being so constructed and arranged that they act predominately as salient pole pieces when said rotor is placed in a stator, and as a low reluctance magnetic shunt protecting said magnets from demagnetization when said rotor is removed from a low reluctance circuit of a magnetizer during the transfer of said rotor from a magnetizer to its stator, and when said rotor is removed from its stator for repairs.

9. A multipole permanent magnet rotor for an alternating current machine including a shaft, a hollow ferro-magnetic bolt fitting over and fastened to said shaft, the body of said bolt having a polygonal outer surface, and a plurality of permanent magnets, said magnets comprising radially mounted hexahedrons with truncated corners at their bases whereby the inner bases of said hexahedrons rest on the matching faces of said polygonal surface, and the rectangular surfaces formed on said magnets due to the truncated corners engage each other, whereby said rectangular surfaces and said bolt form a low reluctance path at the inner ends of said magnets.

10. A multipole permanent magnet rotor as defined in claim 9 which further includes a high conductivity magnet-protecting loop surrounding each of said magnets for preventing demagnetization of said magnets during electrically adverse operating conditions of said rotor.

11. A multipole permanent magnet rotor as defined in claim 9 which further includes two high conductivity side-rings, and a plurality of high conductivity cross-members mechanically and electrically interconnecting said side-rings, the number of said cross-members being equal to the number of the permanent magnets, said cross-members being so positioned that one cross-member lies between each pair of magnets, whereby said rings and said cross-members form a plurality of electrical loops respectively surrounding each of said magnets so as to resist demagnetization of said permanent magnets during electrically adverse operating conditions of said rotor, and ferro-magnetic salient pole-pieces held in fixed relationship with respect to the outer pole-faces of said magnets and said rings, whereby said magnets are rigidly held in fixed relationship with respect to said bolt against centrifugal forces jointly by said pole pieces and by said bolt.

12. A multipole permanent magnet rotor including a shaft, a ferro-magnetic member mounted on said shaft having a polygonal outer surface having a plurality of faces, a plurality of permanent magnets radially mounted on said ferro-magnetic member, the number of the permanent magnets being equal to the number of said faces on said polygonal surface, and the inner ends of said magnets matching the corresponding faces on said surface, and a high conductivity ring with a plurality of openings, the number of said openings being equal to the number of the permanent magnets, said magnets fitting into said openings.

13. A multi-pole permanent magnet rotor as defined in claim 12 which further includes salient pole-pieces mounted over the outer ends of said magnets, said pole-pieces being mechanically secured to said ring whereby said ring and said pole-pieces make said rotor a rigid structure.

14. A multi-pole permanent magnet rotor as defined in claim 12 which further includes salient pole-pieces mounted over the outer ends of said magnets, and a high conductivity circumferential band surrounding said pole-pieces, said band acting as a damper winding for said pole-pieces.

15. A multi-pole permanent magnet rotor as defined in claim 12 which further includes salient pole-pieces mounted over the outer ends of said magnets, and a layer of electroplated copper on the outer faces of said pole-pieces, said layer acting as a damper winding on said pole-pieces.

16. A multipole permanent magnet rotor including a shaft, a ferromagnetic member mounted on said shaft having a polygonal surface along its periphery with a plurality of faces, a plurality of permanent magnets radially mounted on said ferro-magnetic member, the number of the permanent magnets being equal to the number of said faces, and the inner ends of said magnets matching the inner ends of said surface, a high conductivity ring with a plurality of openings, the number of said openings being equal to the number of the permanent magnets, said magnets fitting into said openings, salient pole pieces mounted over the outer ends of said magnets, said pole pieces extending laterally on both sides of said rotor beyond said ring and two ferromagnetic rings mounted on the sides of said high conductivity ring, the diameters of said rings being such as to form air gaps between the extensions of said pole pieces and said rings, said ferromagnetic rings providing a relatively low reluctance path between the adjacent opposite outer poles of said magnets when said rotor is removed from said stator thereby preventing "in air" demagnetization of said permanent magnet.

WILLIAM KOBER.

REFERENCES CITED

The following references are of record in the file of this patent:

UNITED STATES PATENTS

| Number | Name | Date |
|---|---|---|
| 1,275,292 | Neuland | Aug. 13, 1918 |
| 1,574,646 | Hahnle | Feb. 23, 1926 |
| 1,810,844 | Morel | June 16, 1931 |
| 1,883,885 | Durst | Oct. 25, 1932 |
| 1,950,754 | Scofield | Mar. 13, 1934 |
| 1,975,175 | Scofield | Oct. 2, 1934 |
| 1,980,808 | Leibing | Nov. 13, 1934 |
| 2,059,886 | Merrill | Nov. 3, 1936 |
| 2,078,805 | Merrill | Apr. 27, 1937 |
| 2,133,686 | Cox | Oct. 18, 1938 |
| 2,152,918 | Reis | Apr. 4, 1939 |
| 2,189,524 | Randolph et al. | Feb. 6, 1940 |
| 2,193,675 | Merrill | Mar. 12, 1940 |
| 2,213,724 | Vogel | Sept. 3, 1940 |
| 2,233,924 | McKibben | Mar. 4, 1941 |
| 2,407,883 | Jackson | Sept. 17, 1946 |
| 2,432,436 | Morrill | Dec. 9, 1947 |

FOREIGN PATENTS

| Number | Country | Date |
|---|---|---|
| 170,902 | Great Britain | Oct. 31, 1921 |
| 235,004 | Great Britain | June 11, 1925 |
| 335,946 | Italy | Feb. 11, 1936 |